US008512149B2

(12) United States Patent
Walker et al.

(10) Patent No.: US 8,512,149 B2
(45) Date of Patent: Aug. 20, 2013

(54) SYSTEMS, METHODS AND DEVICES FOR PROVIDING AN INDICATION OF AN AMOUNT OF TIME A WAGERING GAME MAY BE EXPECTED TO BE PLAYED GIVEN A SPECIFIED BANKROLL OR AN ESTIMATED BANKROLL WHICH MAY BE EXPECTED TO BE NECESSARY TO FUND PLAY OF A WAGERING GAME FOR A SPECIFIED AMOUNT OF TIME

(75) Inventors: Jay S. Walker, Ridgefield, CT (US); Zachary T. Smith, Norwalk, CT (US); Magdalena M. Fincham, Ridgefield, CT (US)

(73) Assignee: IGT, Reno, NV (US)

( * ) Notice: Subject to any disclaimer, the term of this patent is extended or adjusted under 35 U.S.C. 154(b) by 105 days.

(21) Appl. No.: 12/891,781

(22) Filed: Sep. 27, 2010

(65) Prior Publication Data

US 2011/0077087 A1 Mar. 31, 2011

Related U.S. Application Data

(60) Provisional application No. 61/245,939, filed on Sep. 25, 2009.

(51) Int. Cl.
*G06F 17/18* (2006.01)

(52) U.S. Cl.
USPC .................................. 463/42; 463/16; 463/20

(58) Field of Classification Search
USPC .................................... 463/16, 20, 25–26, 42
See application file for complete search history.

(56) References Cited

U.S. PATENT DOCUMENTS

| | | | |
|---|---|---|---|
| 4,467,424 | A | 8/1984 | Hedges et al. |
| 4,593,904 | A | 6/1986 | Graves |
| 4,636,951 | A | 1/1987 | Harlick |
| 4,669,731 | A | 6/1987 | Clarke |
| 4,764,666 | A | 8/1988 | Bergeron |
| 4,880,237 | A | 11/1989 | Kishishita |
| 4,991,848 | A | 2/1991 | Greenwood et al. |
| 5,042,809 | A | 8/1991 | Richardson |
| 5,069,453 | A | 12/1991 | Koza et al. |
| 5,112,050 | A | 5/1992 | Koza et al. |
| 5,123,649 | A | 6/1992 | Tiberio |
| 5,135,224 | A | 8/1992 | Yamamoto et al. |
| 5,178,390 | A | 1/1993 | Okada |
| 5,257,179 | A | 10/1993 | DeMar |
| 5,275,400 | A | 1/1994 | Weingardt et al. |
| 5,287,269 | A | 2/1994 | Dorrough et al. |

(Continued)

OTHER PUBLICATIONS

Ritchie, Lauren "Orange Man Sought in Betting Probe", Orlando Sentinel Tribune, May 30, 1990 at p. B2, 3 pp.

(Continued)

*Primary Examiner* — Dmitry Suhol
*Assistant Examiner* — Jason Yen
(74) *Attorney, Agent, or Firm* — Fincham Downs, LLC; Magdalena M. Fincham

(57) ABSTRACT

In one embodiment, a method provides for providing a game advisory notice to players of a wagering game. The game advisory notice may comprise, for example, an estimated amount of play time that can be expected to be achieved given a specified bankroll for the wagering game. In another example, the game advisory notice may comprise an estimated bankroll that is expected to be sufficient to fund a specified amount of play time for the wagering game.

22 Claims, 11 Drawing Sheets

(56) References Cited

U.S. PATENT DOCUMENTS

| | | | |
|---|---|---|---|
| 5,290,033 A | 3/1994 | Bittner et al. | |
| 5,308,065 A | 5/1994 | Bridgeman et al. | |
| 5,326,104 A | 7/1994 | Pease et al. | |
| 5,331,546 A | 7/1994 | Webber et al. | |
| 5,333,868 A * | 8/1994 | Goldfarb | 463/18 |
| 5,356,140 A | 10/1994 | Dabrowski et al. | |
| 5,377,975 A | 1/1995 | Clapper, Jr. | |
| 5,401,023 A | 3/1995 | Wood | |
| 5,401,024 A | 3/1995 | Simunek | |
| 5,429,361 A | 7/1995 | Raven et al. | |
| 5,511,781 A | 4/1996 | Wood et al. | |
| 5,531,441 A | 7/1996 | Dabrowski et al. | |
| 5,536,008 A | 7/1996 | Clapper, Jr. | |
| 5,542,669 A | 8/1996 | Charron et al. | |
| 5,551,692 A | 9/1996 | Pettit et al. | |
| 5,569,082 A | 10/1996 | Kaye | |
| 5,570,885 A | 11/1996 | Ornstein | |
| 5,580,311 A | 12/1996 | Haste, III | |
| 5,595,538 A | 1/1997 | Haste, III | |
| 5,601,488 A | 2/1997 | Kadlic | |
| 5,609,337 A | 3/1997 | Clapper, Jr. | |
| 5,613,912 A | 3/1997 | Slater | |
| 5,621,200 A | 4/1997 | Irwin et al. | |
| 5,634,012 A | 5/1997 | Stefik et al. | |
| 5,647,592 A | 7/1997 | Gerow | |
| 5,657,899 A | 8/1997 | Stoken | |
| 5,735,432 A | 4/1998 | Stoken et al. | |
| 5,741,183 A | 4/1998 | Acres et al. | |
| 5,749,784 A | 5/1998 | Clapper, Jr. | |
| 5,758,875 A | 6/1998 | Giacalone, Jr. | |
| 5,766,075 A | 6/1998 | Cook et al. | |
| 5,768,382 A | 6/1998 | Schneier et al. | |
| 5,770,533 A | 6/1998 | Franchi | |
| 5,772,509 A | 6/1998 | Weiss | |
| 5,800,268 A | 9/1998 | Molnick | |
| 5,816,917 A | 10/1998 | Kelmer et al. | |
| 5,816,918 A | 10/1998 | Kelly et al. | |
| 5,830,063 A | 11/1998 | Byrne | |
| 5,830,067 A | 11/1998 | Graves et al. | |
| 5,833,538 A | 11/1998 | Weiss | |
| 5,853,325 A | 12/1998 | Kadlic | |
| 5,910,048 A | 6/1999 | Feinberg | |
| 5,915,588 A | 6/1999 | Stoken et al. | |
| 5,970,143 A | 10/1999 | Schneier et al. | |
| 6,001,016 A | 12/1999 | Walker et al. | |
| 6,012,983 A | 1/2000 | Walker et al. | |
| 6,033,306 A | 3/2000 | De Souza | |
| 6,077,163 A * | 6/2000 | Walker et al. | 463/26 |
| 6,168,522 B1 | 1/2001 | Walker et al. | |
| 6,193,606 B1 | 2/2001 | Walker et al. | |
| 6,203,428 B1 | 3/2001 | Giobbi et al. | |
| 6,244,957 B1 | 6/2001 | Walker et al. | |
| 6,254,483 B1 | 7/2001 | Acres | |
| 6,299,533 B1 | 10/2001 | Parra et al. | |
| 6,306,038 B1 | 10/2001 | Graves | |
| 6,315,662 B1 | 11/2001 | Jorasch et al. | |
| 6,319,127 B1 | 11/2001 | Walker et al. | |
| 6,331,144 B1 | 12/2001 | Walker et al. | |
| 6,343,989 B1 | 2/2002 | Wood et al. | |
| 6,389,538 B1 | 5/2002 | Gruse et al. | |
| 6,394,899 B1 | 5/2002 | Walker | |
| 6,402,148 B1 | 6/2002 | Saruwatari | |
| 6,508,710 B1 | 1/2003 | Paravia et al. | |
| 6,527,638 B1 | 3/2003 | Walker et al. | |
| 6,565,434 B1 | 5/2003 | Acres | |
| 6,578,735 B1 | 6/2003 | Mothwurf | |
| 6,605,001 B1 | 8/2003 | Tarantino | |
| 6,695,700 B2 | 2/2004 | Walker et al. | |
| 6,709,331 B2 | 3/2004 | Berman | |
| 6,722,983 B2 | 4/2004 | Kaminkow et al. | |
| 6,726,563 B1 | 4/2004 | Baerlocher et al. | |
| 6,733,389 B2 | 5/2004 | Webb et al. | |
| 6,769,983 B2 | 8/2004 | Slomiany | |
| 6,846,238 B2 | 1/2005 | Wells | |
| 6,896,616 B2 | 5/2005 | Weiss | |
| 7,076,652 B2 | 7/2006 | Ginter et al. | |
| 7,140,964 B2 | 11/2006 | Walker et al. | |
| 7,156,739 B2 | 1/2007 | Walker et al. | |
| 7,210,141 B1 | 4/2007 | Nathan et al. | |
| 7,213,005 B2 | 5/2007 | Mourad et | |
| 2002/0039923 A1* | 4/2002 | Cannon et al. | 463/42 |
| 2002/0058542 A1 | 5/2002 | Roethel et al. | |
| 2002/0125641 A1 | 9/2002 | Moody | |
| 2002/0132660 A1* | 9/2002 | Taylor | 463/16 |
| 2002/0147040 A1 | 10/2002 | Walker et al. | |
| 2002/0188576 A1 | 12/2002 | Peterson et al. | |
| 2003/0144053 A1 | 7/2003 | Michaelson | |
| 2003/0224854 A1 | 12/2003 | Joao | |
| 2004/0102238 A1* | 5/2004 | Taylor | 463/16 |
| 2004/0147308 A1 | 7/2004 | Walker et al. | |
| 2005/0059452 A1 | 3/2005 | Harti | |
| 2006/0068903 A1* | 3/2006 | Walker et al. | 463/25 |
| 2006/0252511 A1* | 11/2006 | Walker et al. | 463/25 |
| 2007/0254732 A1* | 11/2007 | Walker et al. | 463/16 |
| 2008/0064491 A1* | 3/2008 | Taylor | 463/25 |
| 2008/0096645 A1* | 4/2008 | Frerking et al. | 463/25 |
| 2008/0274792 A1* | 11/2008 | Walker et al. | 463/25 |
| 2009/0117962 A1* | 5/2009 | Filipour et al. | 463/16 |
| 2010/0009742 A1* | 1/2010 | Popovich et al. | 463/25 |
| 2010/0016083 A1* | 1/2010 | Bruce | 463/42 |

OTHER PUBLICATIONS

Mayo, Michael, "Win-Or-Lose-Cruise, You Can Bet Sports Legally Around Here—Just Wait Till the Boat Is 3 Miles Out", Sun-Sentinel, Dec. 28, 1994 at p. 1C, 3 pp.

Cave, Kathy, "The Lake Effect", Milwaukee Journal Sentinel, Mar. 27, 1996 at p. 8, 2 pp.

Busch, Melanie, "Tulsa Firm Explores Internet Gaming", Tulsa World, Aug. 1, 1996, Section: Business, p. E1, 3 pp.

"Electronic Bingo System", Network Gaming International Corporation, (http://network-bingo com/bingo htm), download date: Nov. 13, 1996, 5 pp.

"MGAM Signs Agreement With Lac Vieux Desert Chippewa Tribe", Business Wire, May 18, 2001, 2 pp.

Brochure, "Flying Bet Roulette" DEQ Casinos Ltd., undated, 2 pp.

"GameCast Live—PowerPoint Presentation", (http //www gamecastlive com/presentation/toronto2_files/frame htm), download date: Nov. 24, 2002, 12 pp.

"GameCast Live—Press Release", (http //www gamecastlive com/press_june_6 html), download date: Nov. 24, 2002, 2pp.

"Welcome—i2corp.com", (http //www i2corp com/), download date: Nov. 24, 2002, 1 pg.

"Games—i2corp.com", (http //www i2corp com/games/index cfm), download date: Nov. 24, 2002, 2 pp.

"The Home Gambling Network—Welcome", (http //www homegamblingnetwork com), download date: Nov. 24, 2002, 1 pg.

"The Home Gambling Network—Players", (http //www homegamblingnetwork com/player php3), download date: Nov. 24, 2002, 2 pp.

"Multimedia Games, Inc.—Home", (http www betnet com/), download date: Nov. 24, 2002, 1 pg.

Newsletter sent via email: "The CR Newsletter", do_not_email@crnewsletter.com, email sent Jan. 20, 1998, 1 pg.

Website: "Online blackjack, poker, slots, and more—Casino Vegas Royale", (http www casinovegasroyale com/insurance shtml), Copyright 2002, 1 pg.

Website: "Who Says You Can't Win From Losing? 49er and Three Diamonds Casino Offer 'Free Insurance' for Online Play in July", (http //www smartplayers net/insurance htm), Jun. 14, 2003, 1 pg.

Brochure: "Introducing iView", Bally Gaming Systems, Copyright 2004, 2 pp.

Website: "Bettors Insurance", (http //www bettorsinsurance com/index asp?asp?id=881035&), Copyright 2004, 1 pg.

Website: "Welcome—CasinoActive.Net Offers New Gambling Idea", (http //www bokmaker com/default asp?ACT=5&content=30&id=1), download date: Jul. 26, 2004, 1 pg.

Website: "Gamblers Insurance", (http www u1casino com/rules_gamblers php), download date: Jul. 26, 2004, 1 pg.

Website: "Online Sports Betting—Sportsbet Bookmaker", (http //www sportsbetbookmaker com/aboutus shtml), download date: Jul. 27, 2004, 1 pg.
Website: "SDS Product Group Snapshot", Bally Gaming Systems, (http www ballygaming com/sds/sds_products1 asp), download date: Aug. 9, 2004, 2 pp.
Website: "Cash Back Bonus", (http //www optimalgambling com/casinos/cash-back-bonus-online-casinos htm), download date: Sep. 27, 2004, 1 pg.
Beckett, Rick, "Gambling Insurance?", iWon—Casino, (http //iwon gamblingtimes com/writers/rbeckett/rbeckett_winter2001 html), download date: Sep. 27, 2004, 2 pp.
"GameCast Live—About the Product", (http //www gamecastlive com/about_the product html), download date: Nov. 24, 2002, 1 pg.
Website: "Insuring Your Online Wagers", (http // www winneronline com/articles/November2001/gambling_insu . . . ), Nov. 28, 2001, 1 pg.
Davy, K., "Big Ichigeki! Pachi-Slot Taikouryku Universal Museum—Reader Review", Copyright 1995-2001, Game FAQs, 2 pp.
Website, "GameCast Live—PowerPoint Presentation", (http //www gamecastlive com/presentation/toronto2_files/frame htm), download date: Jan. 20, 2003, 12 pp.
"GameCast Live—Home", (http //www gamecastlive com), download date: Nov. 24, 2002, 1 pg.
Grochowski, John, "Computers Help Players Learn Winning Strategy", Chicago Sun-Times, Jun. 30, 1995, Section: Weekend Plus, Gaming, p. 13, NC, 2 pp.
Pledger, Marcia, "Going for the gold at slot tournaments", Las Vegas Review—Journal, Dec. 24, 1995, p. 5, 4 pp.
Hawley, David, "Those one armed bandits; Slot-machine tournaments lure throngs to Midwest casinos", The Houston Chronicle, Apr. 9, 1996, Section: Houston, p. 3, 3 pp.
Grochowski, John, "Slot tourney prospers under Indiana rules", Chicago Sun-Times, Apr. 6, 1997, Section: SHO, Casinos, p. 15, NC, 1 pg.
"Station Announces formation of GameCast Live, LLC and Release of Remote Play eSlots for In-Room Gaming Applications", PR Newswire, Jun. 6, 2001, Financial News Section, 2 pp.
Website, "Extending the Casino Floor", GameCast Live, (http //www gamecastlive com/presentation/toronto_files/slide0012 htm), download date: Jun. 6, 2001, 12 pp.
U.S. Examiner's Office Action for U.S. Appl. No. 11/423,486, dated Mar. 5, 2008, 10 pp.
U.S. Examiner's Office Action for U.S. Appl. No. 11/273,170, dated Feb. 5, 2008, 8 pp.
U.S. Examiner's Office Action for U.S. Appl. No. 11/423,486, dated Sep. 5, 2007, 6 pp.
Notice of Allowance for U.S. Appl. No. 11/423,486, dated Oct. 20, 2008, 6 pp.
Office Action for U.S. Appl. No. 11/423,488, dated Sep. 5, 2007, 6 pp.
Final Office Action for U.S. Appl. No. 11/423,488, dated Apr. 11, 2008, 5 pp.
Notice of Allowance for U.S. Appl. No. 11/423,488, dated Jul. 9, 2008, 6 pp.
Notice of Allowance for U.S. Appl. No. 11/423,488, dated Nov. 20, 2008, 4 pp.
Notice of Allowance for U.S. Appl. No. 11/423,492 mailed Oct. 28, 2010, 4 pp.
Notice of Allowance for U.S. Appl. No. 11/423,492 mailed Jul. 10, 2010, 6 pp.
Office Action for U.S. Appl. No. 11/423,492 mailed Nov. 9, 2009, 8 pp.
Notice of Allowance for U.S. Appl. No. 11/423,492 mailed Oct. 9, 2008, 6 pp.
Office Action for U.S. Appl. No. 11/423,492 mailed Sep. 19, 2007, 7 pp.

* cited by examiner

400A

| | GAME IDENTIFIER 410A | AVERAGE 420A | HIGH RISK 430A | LOW RISK 440A |
|---|---|---|---|---|
| R401A → | GAME_SAMPLE_123 | 5.5 | 3 | 8 |
| R403A → | GAME_SAMPLE_234 | 12 | 8.5 | 18 |
| R405A → | GAME_SAMPLE_345 | 3 | 1.5 | 5 |

FIG. 4A

400B

| | GAME IDENTIFIER 410B | AVERAGE 420B | HIGH RISK 430B | LOW RISK 440B |
|---|---|---|---|---|
| R401B → | GAME_SAMPLE_123 | $100 | $135 | $80 |
| R403B → | GAME_SAMPLE_234 | $37 | $52 | $22 |
| R405B → | GAME_SAMPLE_345 | $75 | $105 | $60 |

FIG. 4B

500

| | GAME IDENTIFIER 510 | AVERAGE BANKROLL PER HOUR 520 | | | AVERAGE PLAY TIME PER $100 BANKROLL 530 | | |
|---|---|---|---|---|---|---|---|
| | | AVG. 522 | HIGH 524 | LOW 526 | AVG. 532 | HIGH 534 | LOW 536 |
| R501 → | GAME_SAMPLE_123 | $105 | $140 | $85 | 60 MINS. | 45 MINS. | 70 MINS. |
| R503 → | GAME_SAMPLE_123 | $80 | $110 | $65 | 72 MINS. | 55 MINS. | 80 MINS. |

FIG. 5

SYSTEMS, METHODS AND DEVICES FOR PROVIDING AN INDICATION OF AN AMOUNT OF TIME A WAGERING GAME MAY BE EXPECTED TO BE PLAYED GIVEN A SPECIFIED BANKROLL OR AN ESTIMATED BANKROLL WHICH MAY BE EXPECTED TO BE NECESSARY TO FUND PLAY OF A WAGERING GAME FOR A SPECIFIED AMOUNT OF TIME

The present application claims the benefit of Provisional Application Ser. No. 61/245,939, filed on Sep. 25, 2009 in the name of Walker et al. and entitled SYSTEM AND METHODS FOR PROVIDING PLAYERS WITH CASINO GAME ADVISORIES. The entirety of Application Ser. No. 61/245,939 is incorporated by reference herein.

BRIEF DESCRIPTION OF THE DRAWINGS

The foregoing and other features, aspects and advantages of various embodiments are described in detail below with reference to the drawings of the various embodiments, which are intended to illustrate and not to limit any embodiments described herein. The drawings comprise the following figures in which:

FIG. 4A is an example table of one embodiment of an advisory notice database.

FIG. 4B is an example table of one embodiment of an advisory notice database.

FIG. 5 is an example table of one embodiment of a wagering game actual data database.

DETAILED DESCRIPTION OF THE EMBODIMENTS

Figure 1:
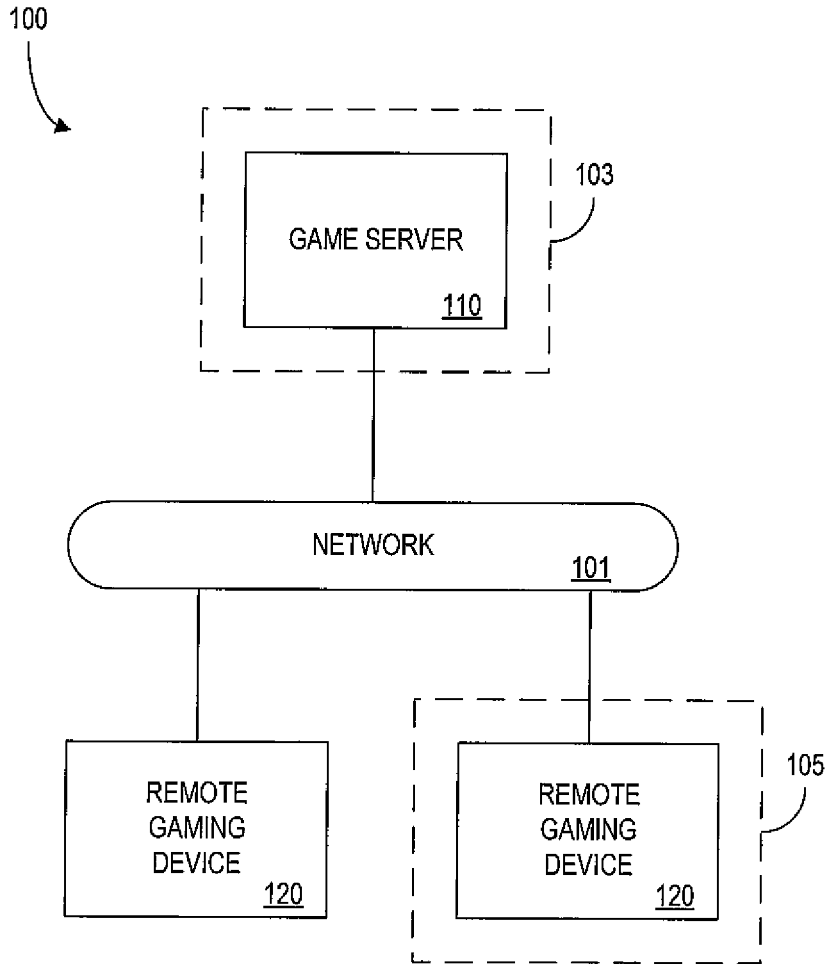
FIG. 1 is a schematic diagram of an embodiment of a remote gaming system.

Certain aspects, advantages, and novel features of various embodiments are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the inventive concepts and obvious modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments. In addition, embodiments of the inventive concepts described herein can comprise several novel features and it is possible that no single feature is solely responsible for its desirable attributes or is essential to practicing the inventions herein described.

Applicants have recognized that players (this term including potential players) of wagering games, such as players of online wagering games, may be interested in being able to compare certain attributes or factors of the wagering games based on a common variable or assumption. For example, a player may be interested in comparing how long he can expect to play Game A on a bankroll of $100 vs. Game B for the same bankroll. In another example, a player may be interested in comparing the size of a bankroll he would need to fund in order to play Game A for one hour vs. the size of the bankroll he would need to fund in order to play Game B for one hour. Currently, there is no way for a player to easily or efficiently obtain this information, much less to obtain the information in an easy to understand manner. Having such information easily available in an understandable manner would provide a player with a valuable tool in making decisions about which games to play. Additionally, having such information would many times limit unexpected losses for a player (e.g., if a player wants to play for an hour but not risk more than a certain amount in losses for the timeframe, embodiments described herein allow the player to easily discern and select the a game that comports with the player's desired play time and maximum loss preferences).

Further, in some embodiments, a player may still further restrict his losses (or play time) by providing an indication of the play time and/or bankroll the player desires to limit his current play session to. A game device and/or game server may then track the player's game play (e.g., decisions made by the player during the session such as wager per payline, number of paylines per round of a game, etc.) and warn the player if the player's wagering decisions are likely to result in the player not being able to comply with the indicated desired play time and/or bankroll. In some embodiments, a game device and/or game server may even prevent a player from implementing a decision that would result in a deviation of an unacceptable magnitude from the desired play time and/or desired bankroll (e.g., the game device and/or game server may reject a wager over a certain magnitude because it would be likely to result in the player depleting his bankroll in less than a preferred amount of time).

In furtherance of various embodiments described herein, contemplated are methods, apparatus and articles of manufacture (e.g., a computer readable medium, such a non-transitory computer readable medium) which provide for (i) determining for a particular wagering game an estimated amount of time a player can expect to play the wagering game with a specified bankroll, thereby determining a duration of a session that can likely be funded by the specified bankroll, wherein the estimated amount of time is determined based on a payback percentage for the wagering game and an assumed value for at least one wagering session parameter; and causing the display (e.g., over the Internet and via an online casino) of the estimated amount of time for the wagering game, thereby causing the display of the duration of the session that can be funded by the specified bankroll. Also contemplated are methods, apparatus and articles of manufacture (e.g., a computer readable medium, such a non-transitory computer readable medium) which provide for (i) determining for a particular wagering game an estimated bankroll a player can expect to fund in order to play the wagering game for a specified amount of time defining a session, the estimated bankroll being determined based on a payback percentage for the wagering game and an assumed value for at least one wagering session parameter defining the session; and (ii) displaying (e.g., over the Internet and via an online casino) the estimated bankroll that is likely to be necessary to fund a session comprising the specified amount of time for the wagering game.

A wagering session parameter may comprise, for example, a variable which (depending upon the value taken on by the variable) may impact a result of a wagering game session. Examples of a wagering session parameter include a wager amount per game play of the session (e.g., an average wager amount, a maximum wager amount, a median wager amount, etc.), a number of decisions to be made by the player during the estimated amount of time comprising a session, a level of risk taking assumed to be employed by the player during the estimated amount of time comprising the session, and a number of paylines per game play wagered upon during the estimated amount of time comprising the session.

In some embodiments, the estimated bankroll and/or the estimated play time is further (or alternatively) based on a volatility of the wagering game and/or historical game play data of the wagering game. In other words, while in some embodiments the estimated bankroll and/or the estimated amount of play time may be determined based purely on statistical or theoretical data (e.g., payback percentage), in other embodiments the estimated bankroll and/or estimated play time may be based on (in addition to or in lieu of being based on the theoretical data) actual data collected by monitoring game play of players.

Figure 9:
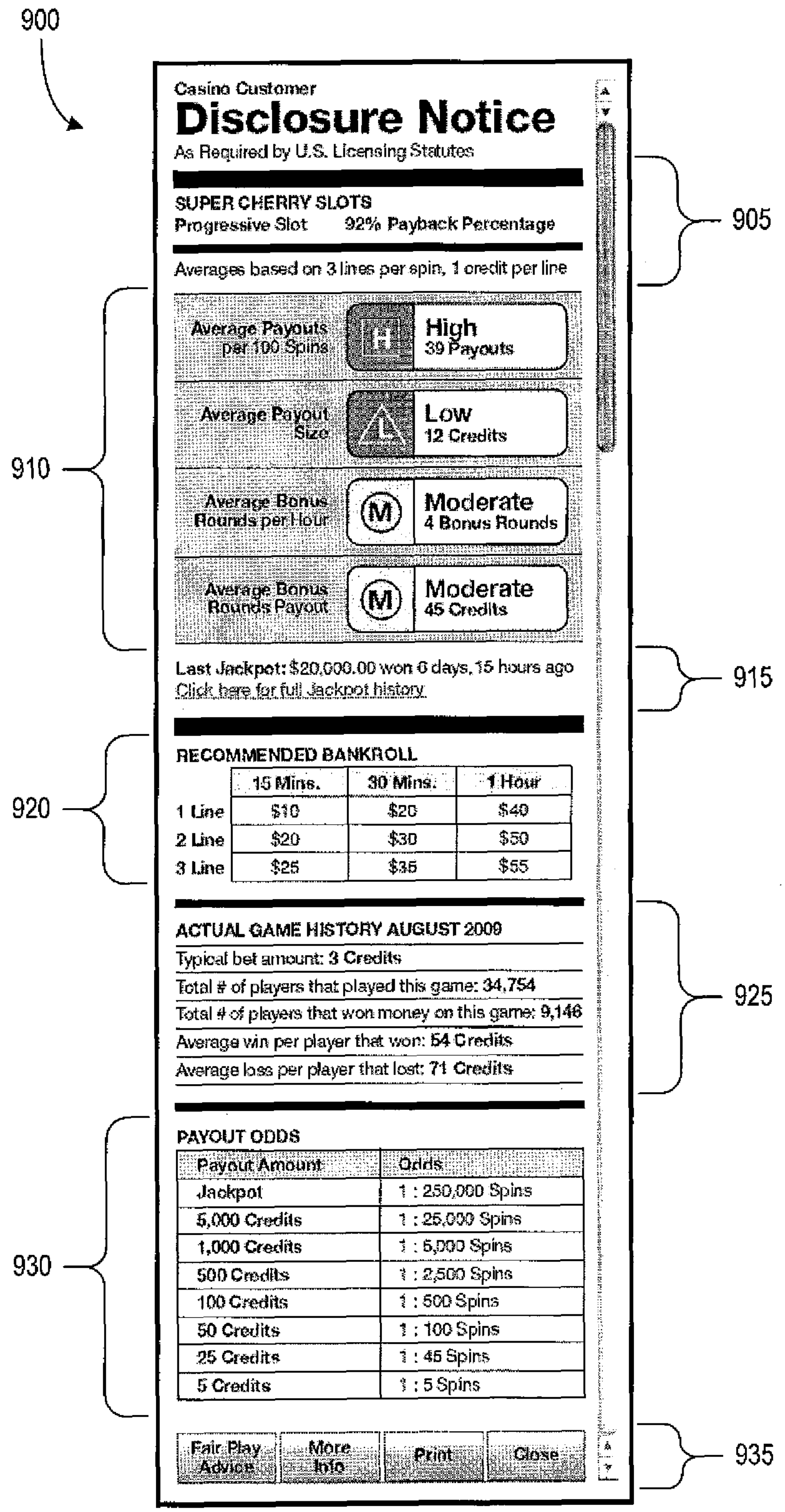
FIG. 9 is a user interface illustrating an embodiment of a game advisory notice for a wagering game that may be output to a player considering play of the wagering game.
Figure 10:
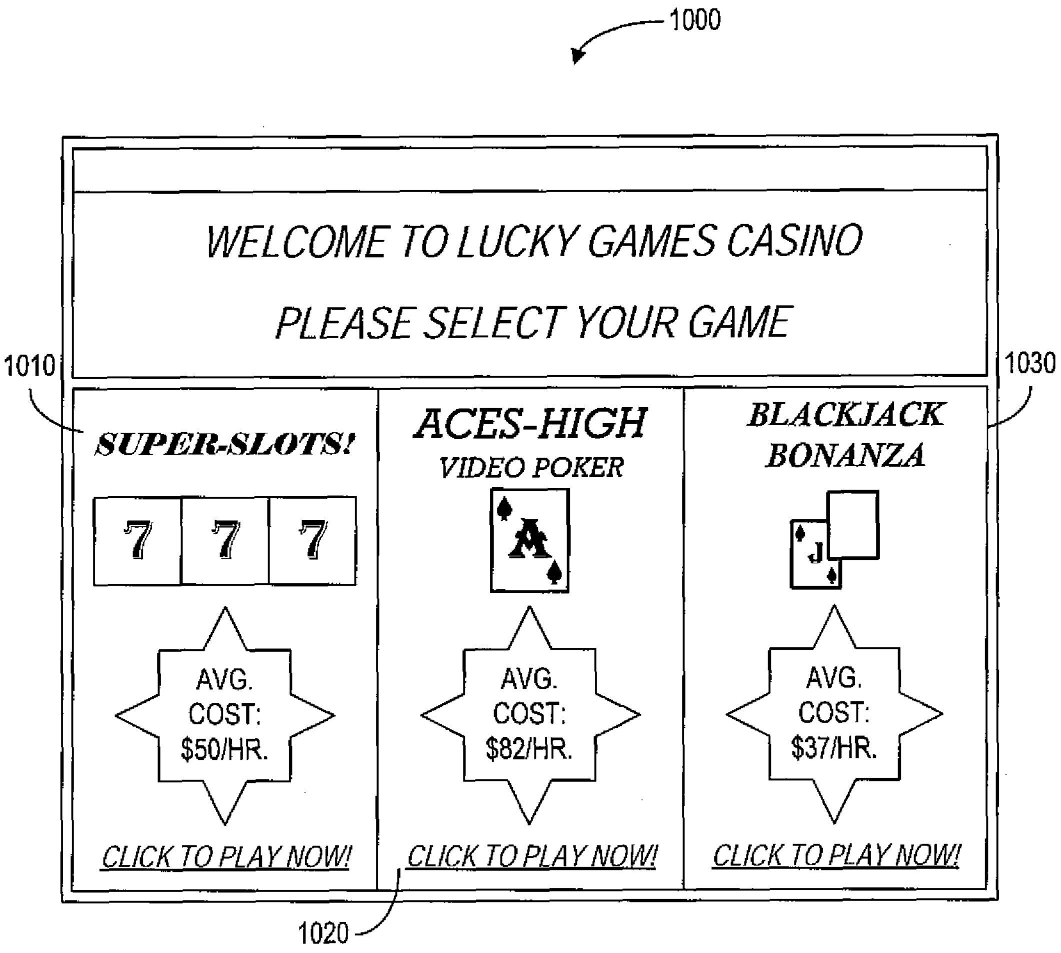
FIG. 10 is a user interface illustrating an embodiment of a plurality of game advisory notice for a three distinct wagering games, that may be output to players considering play of the wagering games.

In some embodiments, the estimated bankroll recommended to play a particular wagering game for a specified amount of play time and/or the estimated amount of play time that is likely to be achieved for a given bankroll on a particular wagering game may be output or provided to a player via a game advisory notice. A "game advisory notice", as the term is used herein, is a display of information regarding a wagering game (which information may comprise information about actual game play, theoretical game play, game odds, game characteristics, etc) that is designed to a help a player or potential player make a decision about whether or not to play and/or how to play the wagering game (e.g., what strategy to employ, magnitude of bankroll to provide). Different examples of game advisory notices are illustrated in FIG. 9 and FIG. 10, respectively. A game advisory notice may be paper based or in digital or electronic form (e.g., a display on an output component of a computing device, such as a screen of a PC, a PDF file, web page, HTML, etc.). Further, in some embodiments this game advisory notice may be provided in a portable medium to a player (e.g., a printed paper, a disc, a PDF file).

In some embodiments, a game advisory notice may include a recommendation for a wagering game. Such a recommendation may be based, for example, on one or more wagering game parameters or wagering session parameters and is generally designed to help a player obtain one or more desired results with respect to the wagering game and/or wagering session. For example, a recommendation may comprise a recommendation of a bankroll that a player should expect to have to provide in order to play a particular wagering game for a specified amount of time (e.g., while employing a specified game strategy). In some embodiments, a recommendation may comprise a recommendation of a strategy to be employed in a wagering game and/or wagering session.

A wagering game parameter and/or wagering session parameter may comprise a variable aspect of the wagering game and/or wagering session, one which may take on one of a plurality of values, such that when it is analyzed in conjunction with one or more other parameters, produces a result which may be useful in making a recommendation (e.g., a recommendation for inclusion on a Game Advisory Notice). For example, a payback percentage for a wagering game is one example of a wagering game parameter. Another example of a wagering game parameter is a magnitude and/or frequency of the top jackpot for the wagering game. Examples of wagering session parameters include, but are not limited to, a duration of the wagering session (e.g., defined in terms of an amount of time or rounds of the wagering game), an average, median, maximum or minimum wager made during the wagering session, an average number of paylines wagered per round of a wagering game during the wagering session and a strategy (e.g., a high risk, high volatility strategy vs. a low risk, low volatility strategy) employed during the wagering session.

It should be understood that, although many scenarios and implementations are described herein in the context of an online casino, the embodiments described herein are not limited to use with remote gaming devices communicating with a game server over the Internet.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

The term "bankroll", as used herein, refers to the financial resources used to fund a session of play of a wagering game.

The terms "session", "gambling session" and "wagering session", used interchangeably herein, refer to a plurality of rounds of a wagering game played consecutively, generally defined as the consecutive rounds played between a cash in and cash out event.

The term "online casino", as used herein, refers to an entity or system of components which facilitates gambling by use of a network, such as the Internet, but may also encompass the facilitating of gambling by use of proprietary or closed networks (e.g., an intranet or wide area network) as well. For example, an online casino may be a website that accepts wagers and provides wagering games in a digital format over the internet.

A "wagering game", as the term is used herein, may comprise any game on which a player can risk a wager or other consideration, such as, but not limited to: slot games, poker games, blackjack, baccarat, craps, roulette, lottery, bingo, keno, casino war, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Referring now to FIG. 1, illustrated therein is an example system 100 consistent with one or more embodiments. The system 100 comprises a game server 110, two distinct remote game devices 120, which in some embodiments may each be operable to communicate with at least one other device of system 100 via a network 101. The network 101 may comprise, for example, the Internet, a wide area network, another network or a combination of such networks. Additionally, in some embodiments a remote game device 120 may be located behind a firewall 103 or on a local or proprietary network 103. Similarly, in some embodiments a game server 110 may be located behind a firewall 105 or a local or proprietary network 105. It should be understood that although not shown in FIG. 1, other networks and devices may be in communication with any of the devices of system 100. For example, a remote game device 120 may be in communication with a mobile network (not shown) such as a pager or cellular telephone network that accommodates wireless communication with mobile devices as is generally known to those skilled in the art.

Figure 2:
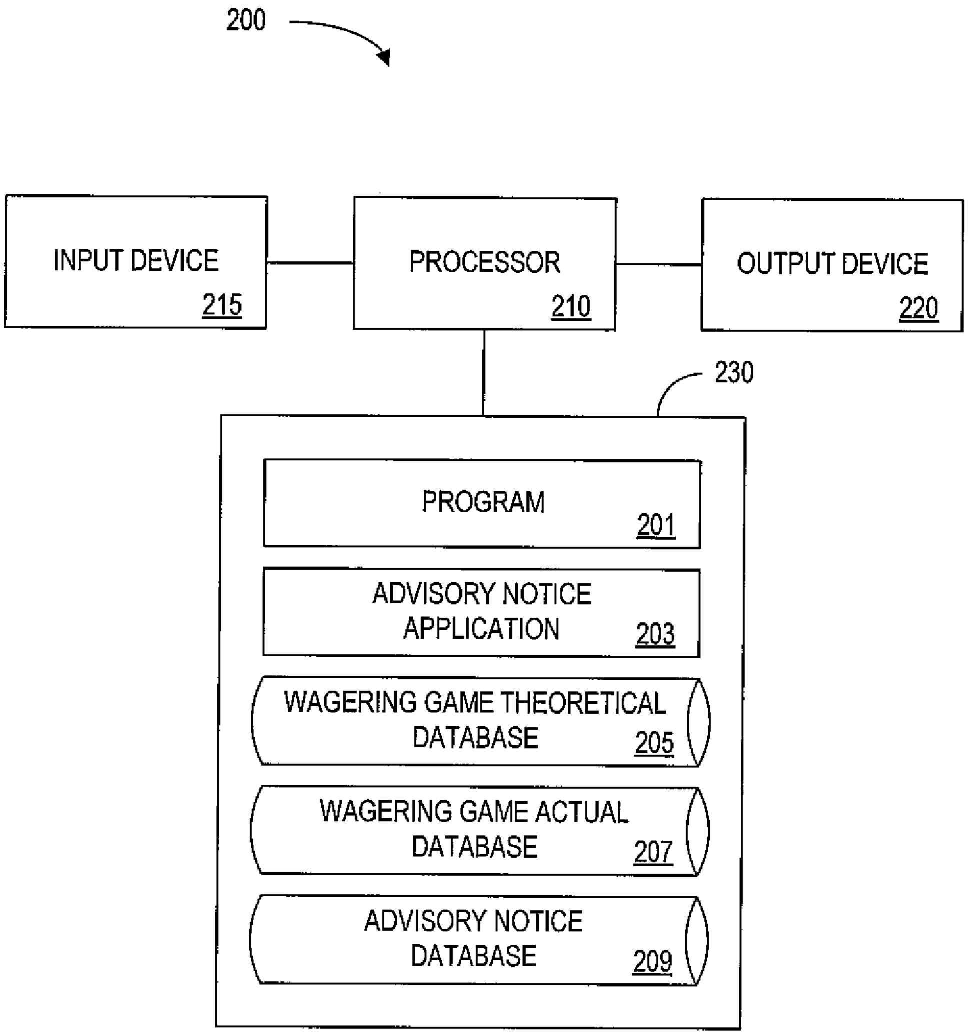
FIG. 2 is a block diagram of an embodiment of a game server.

The game server 110 may comprise one or more computing devices, working in parallel or series if more than one, operable to facilitate the wagering game recommendations (e.g., in the form of a Game Advisory Notice) functionality described herein. A more detailed description of an example game server is provided herein with reference to FIG. 2. It should be noted, however (as illustrated in FIG. 2 (described in detail below)), that a game server may comprise one or more processors. Typically a processor (e.g., one or more microprocessors, one or more microcontrollers, one or more digital signal processors) of a game server 110 will receive instructions (e.g., from a memory or like device), and execute those instructions, thereby performing one or more processes defined by those instructions. Instructions may be embodied in, e.g., one or more computer programs and/or one or more scripts. Similarly, a remote game device 120 may comprise one or more processors operable to receive and execute instructions.

A remote game device 120, in accordance with some embodiments described herein, may comprise a computing device that is operable to execute or facilitate the execution of a game program and used or useful by an online gambler for accessing an online casino. For example, a remote game device 120 may comprise a computer workstation, laptop, mobile device, tablet computer, Personal Digital Assistant (PDA) devices, cellular or other wireless telephones (e.g., the Apple® iPhone™), video game consoles (e.g., Microsoft® Xbox 360™, Sony® Playstation® 3, and/or Nintendo® Wii™), and/or handheld or portable video game devices (e.g., Nintendo® Game Boy® or Nintendo® DS™). A remote game device 120 may comprise and/or interface with various components such as input and output devices (each of which is described in detail with respect to FIG. 2). A remote game device 120 may, in some embodiments, be a dedicated gaming device (e.g., a slot machine) or a non-dedicated gaming device (e.g., an iPad™). It should be noted that a game server 110 may be in communication with a variety of different types of remote game devices 120.

A remote game device 120 may be used to play a wagering game over a network and transmit information relating to a recommendation for a wagering game to an online gambler contemplating play of the wagering game (or a comparison of recommendations or estimations for a plurality of wagering games the online gambler is contemplating, to aid the online gambler in selecting the wagering game and/or wagering session parameters, as described herein). Any and all information relevant to any of the aforementioned functions may be stored locally on one or more of the remote game devices 120 and/or may be accessed using one or more of the remote game devices 120 (in one embodiment such information being stored on, or provided via, the game server 110). In another embodiment, the game server 110 may store some or all of the program instructions for determining, calculating, outputting, storing or otherwise facilitating a recommendation or estimation for a wagering game or wagering game session (e.g., an estimated bankroll sufficient to fund a session of a specified duration), and the one or more remote game devices 120 may access such information and/or program instructions remotely via the network 101 and/or download from the game server 110 (e.g., a web server) some or all of the program code for executing one or more of the various functions described in this disclosure. It should be noted that the plurality of remote game devices 120 may each be located at the same location as the other remote game devices 120 and/or the game server 110 or at another location. It should further be noted that while the game server 110 may be useful or used by any of the remote game devices 120 to perform certain functions described herein, it need not control any of the remote game devices 120. For example, in one embodiment the game server 110 may comprise a server hosting a website of an online casino.

In some embodiments, a game server 110 and/or one or more of the remote game devices 120 stores and/or has access to data useful for evaluating or determining wagering game data (e.g., theoretical and/or actual data) in order to determine and/or output one or more wagering advisory notices for a wagering game. Such a wagering advisory notice may include one or more of: (i) an estimated amount of play time a player may expect to play a wagering game in exchange for a specified bankroll; (ii) an estimated bankroll a player may expect to provide in exchange for playing a wagering game for a specified amount of play time; (iii) whether (and by how much) actual play results deviate from theoretical play results for a given unit of time or a given number of game plays; (iv) on average, how often a player may expect to win when playing a particular wagering game; (v) on average, how often a player may expect to enter a bonus round when playing a particular wagering game; and/or (vi) information relating to one or more mediation events that may be initiated if it is determined that a player has or desires to implement a wagering decision that would result from a recommendation made to (or committed to) by the player. In an example of (v), a player may be prevented from placing a wager on a round of a wagering game that would result in it being unlikely that the player's previously indicated bankroll would be sufficient to fund the player's play of the wagering game for a session of a duration previously selected by the player as his target session duration.

A game server 110 may comprise a computing device for administering or facilitating the determination, output and/or enforcement of a recommendation for a wagering game (e.g., the storage, calculation and/or determination of data useful for purposes of creating and/or outputting the content of a Game Advisory Notice, such as data useful for making a recommendation to a player (e.g., a recommendation of a bankroll that should be sufficient to fund a session of a specified duration)). For example, the game server 110 may comprise a game server operated by an online casino. In some embodiments, the game server 110 may further be operable to facilitate a game program for a wagering game. In accordance with some embodiments, in addition to administering or facilitating the determination, output and/or enforcement of one or more recommendations for a wagering game, a game server 110 may comprise one or more computing devices responsible for handling online processes such as, but not limited to: serving the website to a player's computer, processing transactions, managing accounts, controlling wagering games, etc. In some embodiments, game server 110 may comprise two or more server computers operated by the same entity (e.g., one server being primarily for storing, determining, outputting and/or enforcing data associated with a recommendation for a wagering game (such as via a Game Advisory Notice) and another server being primarily for providing wagering games to online gamblers).

In some embodiments, game server 110 may include a game advisory notice engine, which may comprise software, hardware and/or firmware for determining and/or facilitating a recommendation regarding a wagering game. For example, a game server 110 may comprise a program, associated databases or other files and hardware for (i) storing theoretical and/or actual data associated with a wagering game; (ii) storing, determining and/or calculating in real time one or more recommendations for the wagering game; (iii) storing, determining and/or calculating other content for a Game Advisory Notice; (iv) storing recommendations, preferences or goals a player has indicated as desirable (or has committed to achieving) for a particular wagering session; (v) receiving, analyzing, evaluating and/or storing one or more values for a wagering session parameter; and/or (vi) initiating (or directing or causing another device to initiate) a mediation event based on a wagering activity of a particular player and a previous indication from the player of a goal for a current session the player has selected (or committed) to achieve.

In some embodiments, the system 100 (or at least the game server 110) may be controlled and/or operated by an online casino or by another entity (e.g. a regulatory body, a law enforcement agency, a private corporation or another entity). Thus, in some embodiments a casino may be responsible for providing, managing and/or administering one or more casino games to one or more servers. As related to the specific embodiments described herein, a casino is may also be responsible for management of Game Advisory Notices and/or recommendations (e.g., strategy recommendations). As described herein, while in some embodiments, a casino may be a physical building containing casino games; in another embodiment a casino may be a virtual space on a network or stand alone machine that provides online casino games (e.g., over the Internet).

The system 100 may be operable to facilitate communication among the devices 110 and 120 using known communication protocols. Possible communication protocols that may be part of the system 100 include, but are not limited to: Ethernet (or IEEE 802.3), ATP, BLUETOOTH, HTTP, HTTPS and Transmission Control Protocol/Internet Protocol (TCP/IP). Communication may be encrypted to ensure privacy and prevent fraud in any of a variety of ways well known in the art, some of which are described herein.

It should be understood that although only two remote game devices 120 and one game server 110 is illustrated, any number of remote game devices 120 and game servers 110 may be used and, in many embodiments, a large number of at least the remote game devices 120 would be part of system 100, the number changing as users are added/registered with the system and/or discontinue using the system.

Referring now to FIG. 2, illustrated therein is a block diagram of an apparatus 200 according to some embodiments. In some embodiments, the apparatus 200 may be similar in configuration and/or functionality to any of the remote game devices 120 and/or the game server 110 of FIG. 1. The apparatus 200 may, for example, execute, process, facilitate, and/or otherwise be associated with any of the processes 600, 700 and/or 800 described in conjunction with FIG. 6, FIG. 7 and/or FIG. 8, respectively, herein.

In some embodiments, the apparatus 200 may comprise a processor 210, an input device 215, an output device 220 and/or a memory device 230. Fewer or more components and/or various configurations of the components 210, 215, 220 and/or 230 may be included in the apparatus 200 without deviating from the scope of embodiments described herein.

According to some embodiments, the processor 210 may be or include any type, quantity, and/or configuration of processor that is or becomes known. The processor 210 may comprise, for example, an Intel® IXP 2800 network processor or an Intel® XEON™ Processor coupled with an Intel® E7501 chipset. In some embodiments, the processor 210 may comprise multiple inter-connected processors, microprocessors, and/or micro-engines. According to some embodiments, the processor 210 (and/or the apparatus 200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 210 comprises a server such as a blade server, necessary power may be supplied via a standard AC outlet, power strip, surge protector, and/or Uninterruptible Power Supply (UPS) device.

In some embodiments, the input device 215 and/or the output device 220 are communicatively coupled to the processor 210 (e.g., via wired and/or wireless connections and/or pathways) and they may generally comprise any types or configurations of input and output components and/or devices that are or become known, respectively.

The input device 215 may comprise, for example, a keyboard that allows an operator of the apparatus 200 to interface with the apparatus 200 (e.g., by a player, an employee or other worker affiliated with either an online casino or other entity operating a system operable to facilitate the functions described herein). In some embodiments, the input device 215 may comprise a sensor configured to provide information such as an indication of a factor relevant to game play activity of a player, such information being provided to the apparatus 200 and/or the processor 210. Examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a touch-screen, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 220 may, according to some embodiments, comprise a display screen and/or other practicable output component and/or device that is operable to output information. The output device 220 may, for example, provide instructions, guidance, questions or information to an online gambler (e.g., information relevant to a recommendation or Game Advisory Notice for one or more wagering games) or an employee or other worker affiliated with either an online casino or other entity operating a system operable to facilitate the functionality described herein (e.g., actual game data or data obtained from players actually playing one or more wagering games). Some additional examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 215 and/or the output device 220 may comprise and/or be embodied in a single device such as a touch-screen monitor.

In some embodiments, the apparatus 200 may comprise any type or configuration of communication device (not shown) that is or becomes known or practicable. For example, the apparatus 200 may include a communication device such as a NIC, a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., player selections and/or actual game data) to a server (e.g., server 110) in communication with a plurality of remote game devices 120. According to some embodiments, the communication device may also or alternatively be coupled to the processor 210. In some embodiments, the communication device may comprise an IR, RF, Bluetooth™, and/or Wi-Fi® network device coupled to facilitate communications between the processor 210 and another device.

The memory device 230 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 230 may, according to some embodiments, store a program 201 for facilitating one or more of the embodiments described herein, which program may include a game advisory notice application, module or engine (e.g., a self-contained program for facilitating the determination, input, output, calculation and/or selection of data comprising content for a game advisory notice) 203. In some embodiments, the game advisory notice application 203 may be utilized by the processor 210 to provide output information via the output device 220 and/or use data received via the input device 215 to compute or determine additional data. For example, the game advisory notice application 203 may receive actual game data via input device 215 and utilize such data, along with data stored in wagering game theoretical database 205 to compute (or determine by looking up in a database) a recommendation for a wagering game. In another example, the game advisory notice application 203 may receive an indication of a recommendation or goal from a player (e.g., a goal of a duration for a session to be funded by a specified bankroll), store such goal in association with the player (e.g., in game advisory notice database 209), receive (e.g., via input device 215) game play information indicative of the player's decisions during a session and determine whether warning (or mediation event, such as prevention of implementation of a player's desired decision) should be output (e.g., if the player's desired decision would make it unlikely for the player to meet the player's desired goal).

Figure 6:
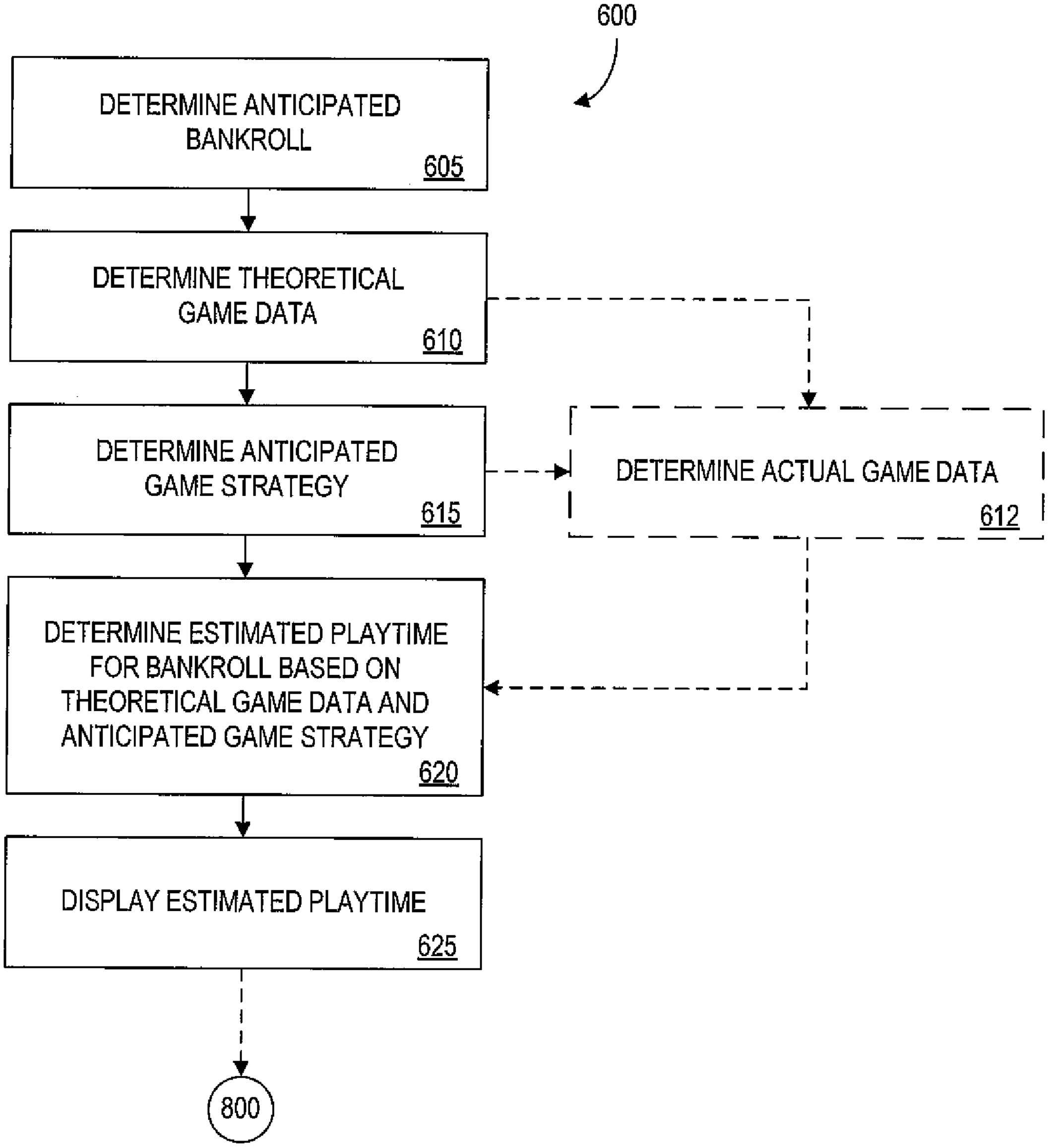
FIG. 6 is a flowchart illustrating an example process that may be performed at least by a game server in accordance with an embodiment.
Figure 7:
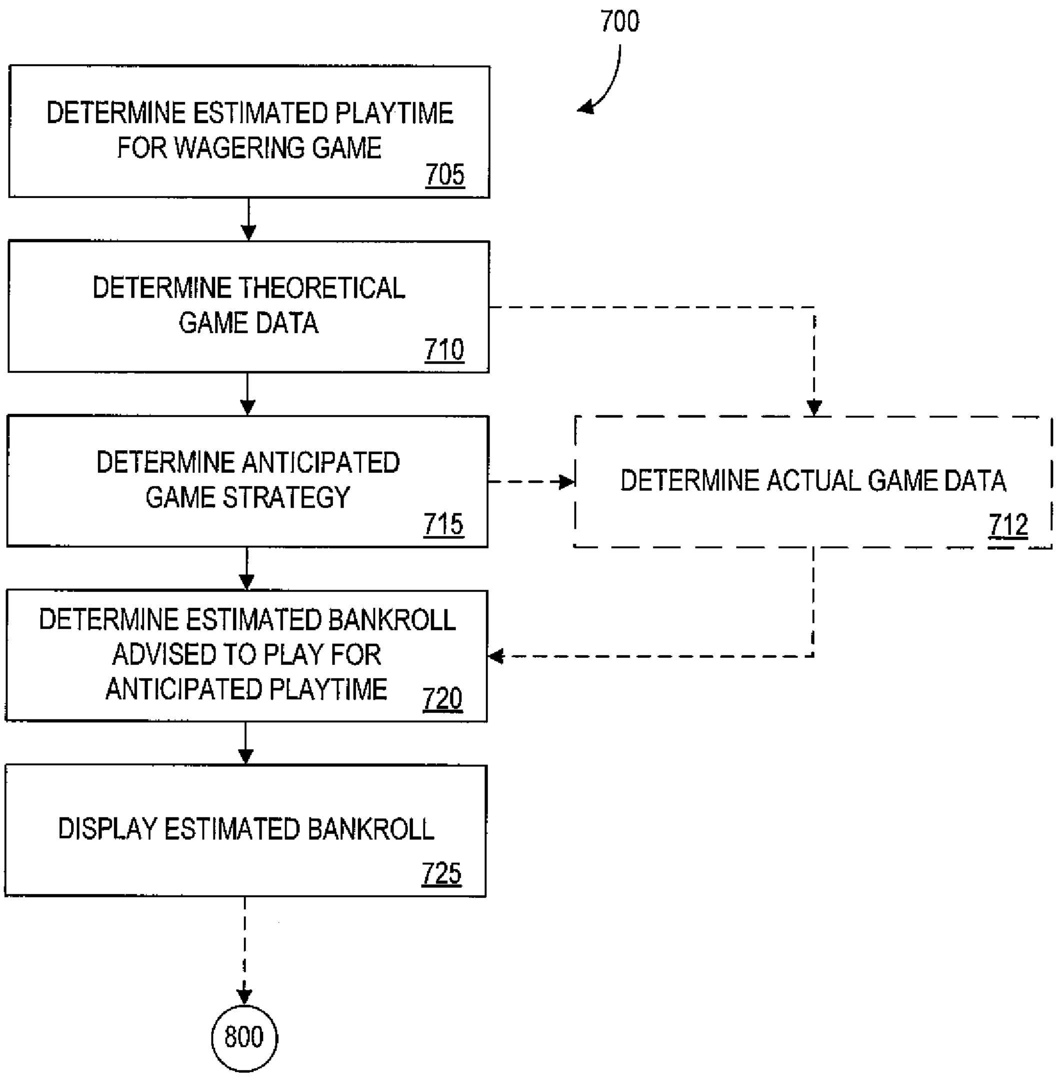
FIG. 7 is a flowchart illustrating an example process that may be performed at least by a game server in accordance with an embodiment.
Figure 8:
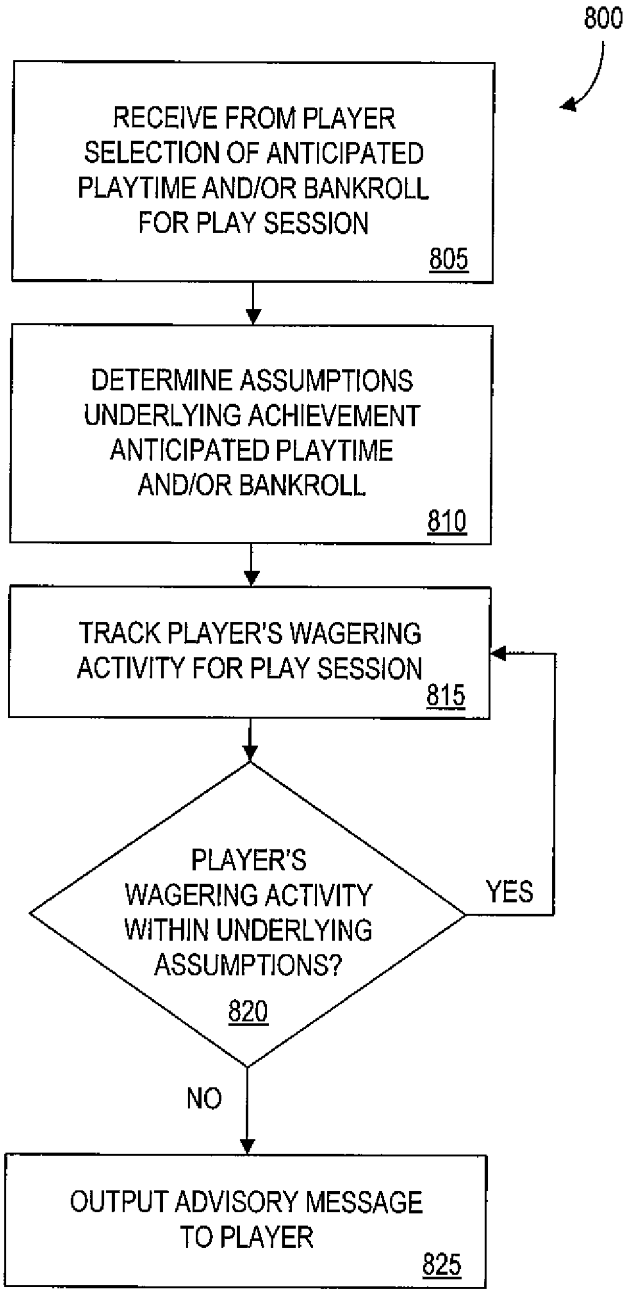
FIG. 8 is a flowchart illustrating an example process that may be performed at least by a game server in accordance with an embodiment.

According to some embodiments, data received via input device 215 into the game advisory notice application 203 may, for example, be data mined, analyzed, sorted, filtered, decoded, decompressed, ranked, scored, plotted, and/or otherwise processed by the processor 210 in accordance with the instructions of game advisory notice application 203 (e.g., in accordance with the method 600 of FIG. 6, the method 700 of FIG. 7 and/or the method 800 of FIG. 8). In some embodiments, any information obtained by use of the game advisory notice application 203 may be stored, analyzed, forwarded or otherwise utilized by the processor 210 (e.g., may be stored as in the game advisory notice database 209 and/or analyzed or forwarded to software and/or human personnel in accordance with the program of the advisory notice application 203). Such information may then be utilized for various purposes as described herein.

In one or more embodiments, the advisory notice application 203 comprises software operable to support (e.g., obtain information from and output information to) a player interface that allows a player to input a desired one or more wagering game or wagering session parameters (e.g., wager size, rate of play, bankroll, desired length of play, etc.) and receive suggestions regarding a game strategy, as well as expectations about the result of a game session (e.g., "you can expect to lose $x" or "you can expect to play for 30 minutes"). Of course, as will be understood upon reading the present disclosure, in some embodiments recommendations may be provided even without any input from the player (e.g., one or more recommendations can be output via a menu or other display for all interested player to view; in some embodiments, such a recommendation may be associated with one or more wagering game or wagering game session parameters used to determine the recommendation).

In some embodiments, the advisory notice application 203 may comprise a subroutine for determining and/or populating the content of a game advisory notice. Such a subroutine may be referred to as a game advisory notice generator. A game advisory notice generator may comprise hardware and/or software used by a casino, a remote game device 120 or a game server 110, to create and or populate a game advisory notice with information as described herein. A game advisory notice generator may store or have access to wagering game information, such as game odds, rules and or other characteristics of the wagering game. The game advisory notice generator may also process actual game data periodically, non-periodically and/or in real time in order to generate information necessary or desired for a game advisory notice. It should be understood that in some embodiments a game advisory notices may be paper-based or based on a portable medium output to a player. In another embodiment, however, game advisory notices may be embodied as digital information provided to a player via a screen or display (e.g., a screen of the player's PC). In some embodiments, game advisory notices may be provided in electronic form to a player in a manner that is savable and reproducible by the player (e.g., a PDF document).

In some embodiments, an advisory notice application 203 may comprise a subroutine for determining, generating, calculating and/or creating recommendations for players of wagering games. Such a subroutine may, in some embodiments, comprise a portion of the game advisory notice generator described above. In some embodiments, it may be embodied as a stand-alone subroutine that may be referred to as a recommendation generator. In either embodiments, such a subroutine may comprise, for example, hardware and or software used to store and/or access game specific information, such as game odds, rules and other characteristics of a wagering game. Such a subroutine may also process actual game data periodically, non-periodically and/or in real time to generate strategy recommendations (either as part of a game advisory notice, in response to input of goals, desired wagering session characteristics or otherwise). Additionally, support for a recommendation interface that receives wagering game or wagering session parameters from a player may also be a component of a recommendation generator.

In some embodiments, the advisory notice application 203 may also comprise a subroutine (and, e.g., hardware) operable to analyze actual game history data (e.g., as stored in the wagering game actual database 207 and integrate and/or compare such analysis with theoretical wagering game data and/or a computation, analysis or determination for the content of a game advisory notice and/or recommendation to output to players. Such a subroutine may be referred to as a game history auditor.

As alluded to above, the memory device 230 also stores several databases: (i) a wagering game theoretical database 205 which stores theoretical or statistically-determined data associated with one or more wagering games; (ii) a wagering game actual database 207 which stores actual data obtained for one or more wagering games based on historical play of the game by players; and (iii) an advisory notice database 209 which stores data associated with one or more game advisory notices (e.g., content for one or more game advisory notices, goals and/or recommendations selected and/or committed to by a player based on information output to the player via a game advisory notice). Each of these databases is described in detail herein, with reference to FIG. 4, FIG. 5 and FIG. 6, respectively. Although the databases 205, 207 and 209 are described as being stored in a memory of apparatus 200, in other embodiments some or all of these databases may be partially or wholly stored, in lieu of or in addition to being stored in a memory of apparatus 200, in a memory of one or more other devices. Further, some or all of the data described as being stored in the memory device 230 may be partially or wholly stored (in addition to or in lieu of being stored in the memory device 230) in a memory of one or more other devices. Such one or more other devices may comprise, for example, a remote storage service server (e.g., an online back-up storage server, as would be understood by one of ordinary skill in the art).

The apparatus 200 may function as a computer terminal and/or server of an online casino or other entity operating a system 100, to receive and/or manage information related to game advisory notices or other forms of recommendations output to players of wagering games. In some embodiments, the apparatus 200 may comprise a web server and/or other portal (e.g., an IVRU) that serves as an intake portal for data associated with game advisory notices. In some embodiment, the apparatus 200 may comprise a workstation or mobile device utilized by a live person who works with game advisory notices. In some embodiments, the apparatus 200 may comprise an apparatus that is operable to interact with a player of a wagering game.

Any or all of the exemplary instructions and data types described herein and other practicable types of data may be stored in any number, type, and/or configuration of memory devices that is or becomes known. The memory device 230 may, for example, comprise one or more data tables or files, databases, table spaces, registers, and/or other storage structures. In some embodiments, multiple databases and/or storage structures (and/or multiple memory devices 230) may be utilized to store information associated with the apparatus 200. According to some embodiments, the memory device 230 may be incorporated into and/or otherwise coupled to the apparatus 200 (e.g., as shown) or may simply be accessible to the apparatus 200 (e.g., externally located and/or situated).

In some embodiments the apparatus 200 may embody a game server 110 and may be operable to configure a remote game device 120 remotely, update software stored on one or more remote game devices 120 and/or to download software or software components to one or more remote game devices 120. For example, a game server 110 may be operable to download (e.g., at the request of a user) software to a remote game device 110 that facilitates the functionalities described herein.

Referring now to FIG. 3, FIG. 4A, FIG. 4B and FIG. 5, each of these figures illustrates a respective example structure and sample contents of a database that may be useful in some embodiments. The specific data and fields illustrated in FIG. 3, FIG. 4A, FIG. 4B and FIG. 5, respectively, represents only some embodiments of the records that may be stored in such databases. The data and fields of such databases can be readily modified, for example, to include more or fewer data fields. A single database that is a combination of multiple databases, or a configuration that utilizes multiple databases for a single database illustrated herein may also be employed. Note that in the databases of FIGS. 3, 4A, 4B and 5, a different reference numeral is employed to identify each field. However, in at least one embodiment, fields that are similarly named (e.g., a wagering game identifier) may store similar or the same data in a similar or in the same data format.

As will be understood by those skilled in the art, the schematic illustration and accompanying descriptions of data contained in the sample database presented herein is an exemplary arrangement for stored representations of information. Any number of other arrangements may be employed besides those suggested by the table shown. For example, the embodiments described herein could be practiced effectively using more functionally equivalent databases. Similarly, the illustrated entries of the database represent exemplary information only; those skilled in the art will understand that the number and content of the entries can be different from those illustrated herein. Further, despite the depiction of the database as a table, an object-based model could be used to store and manipulate the data types of one or more embodiments and likewise, object methods or behaviors can be used to implement the processes of one or more embodiments.

Figure 3:
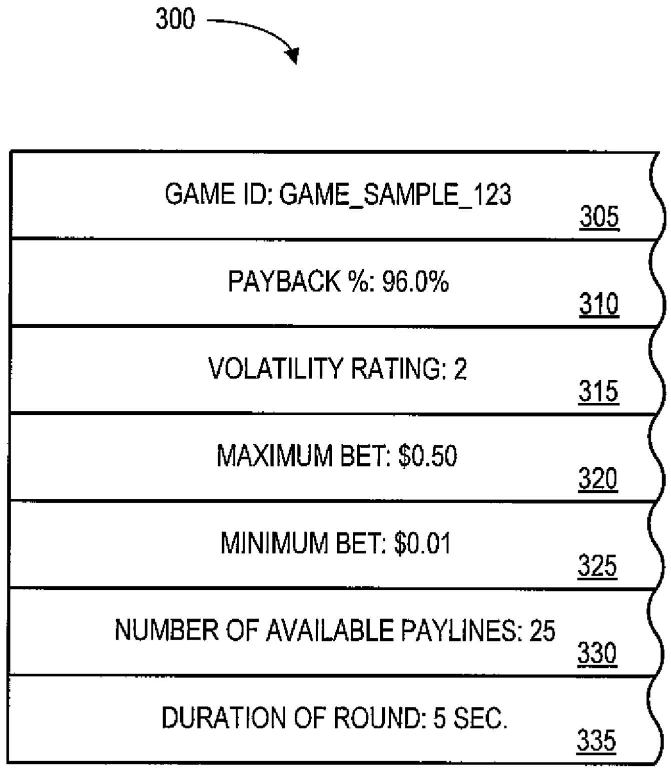
FIG. 3 is an example table of one embodiment of a wagering game theoretical data database.

FIG. 3 is a tabular representation 300 of an example record of an embodiment of wagering game theoretical database 205 (e.g., as it may be stored in a memory of an apparatus 200). Tabular representation 300 is referred to herein as record 300.

The record 300 includes a number of example fields or entries, each defining a wagering game in terms of theoretical data corresponding to the wagering game (e.g., data determined based on statistics, probabilities or other theoretical or mathematical computations). Those skilled in the art will understand that a wagering game theoretical database 205 may include any number of records. The record 300 also defines the following example fields (i) a game ID 305 which uniquely identifies a wagering game available for play to one or more players; (ii) a payback percentage 310; (iii) a volatility rating 315; (iv) a maximum bet 320 which indicates the maximum wager allowable per round (or, in some cases, per payline or hand) of the wagering game; (v) a minimum bet 325 which indicates the minimum wager allowable per round (or, in some cases, per payline or hand) of the wagering game; (vi) a number of available paylines 330 which indicates the maximum number of available paylines (or hands or other unique wagering opportunities) per round of the wagering game; and (vi) a duration of a typical round of the wagering game 335, which indicates the amount of time it takes to resolve a round of the wagering game (e.g., useful in determining how many rounds of the wagering game may be resolved within a specified unit of time). It should be understood that additional theoretical information may be stored regarding a wagering game. For example, a number of decisions per unit of time (or per round) or information regarding a bonus round available during the wagering game may be stored in some embodiments.

The payback percentage 310 indicates the overall percentage of funds wagered on the wagering game that wagering game will return to players of the wagering game in the long run. Typically, a payback percentage is programmed into a wagering game and set by the manufacturer to the specifications that a casino wishes to use for that wagering game. Some states regulate the minimum payback that a wagering game can return. Wagering games with a small payback may be referred to as "tight" while wagering games with a large payback percentage may be referred to as "loose." Thus, for example, a wagering game with a payback percentage of 93% may be thought of as returning to players, in the long run, $0.95 of each $1.00 wagered on the wagering game. However, as noted, these payback percentages are calculated over the long run and over many, many rounds of the wagering game. Thus, for a short session which a player may participate in (e.g., lasting 500 or fewer rounds), the actual payback percentage for that session may be quite different from the overall payback percentage of the wagering game. In some embodiments, a related concept of "house edge" may be used instead of the payback percentage. The house edge of a wagering game is the casino profit expressed as a percentage of players' original wagers. Thus, for example, a wagering game with a payback percentage of 93% may be referred to as a wagering game with a house advantage of 7%.

A volatility rating 315 may comprise an indication of the volatility of the wagering game. Volatility of a wagering game refers to the ration of the magnitude vs. the frequency of available prizes or awards. Thus, a wagering game which has very large prizes that are awarded relatively infrequently may be said to have a higher associated volatility than another wagering game which offers relatively smaller but more frequent prizes. In some embodiments, the relative volatilities of available wagering games may be standardized for efficient comparison by associating a volatility rating to each game. Thus, for example, a high volatility game may be assigned a rating of "1", a medium volatility game may be assigned a rating of "2" and a low volatility game may be assigned a rating of "3." Of course, this is a simplified volatility rating scheme and many different rating schemes, some of which may be complex and based on a more granular and mathematical analysis, may be used. In some embodiments, the Volatility Index (VI) for a wagering game may be stored as a volatility rating 315. The VI is usually based on the 90% confidence interval and may be calculated by multiplying 1.65 times the standard deviation for the paytable of the wagering game. The VI is one way to compare wagering games based on how many spins or rounds it will take for the actual payback of the wagering game to approach the theoretical payback. The higher the VI, the more spins or rounds it will take. Many popular wagering games have VIs in the teens or twenties.

Theoretical game data for wagering games, such as that illustrated in record 300, may in some embodiments be useful for determining or calculating a recommendation for a wagering game based on one or more assumed or specified values for one or more wagering game parameters and/or one or more wagering session parameters. For example, the data of record 300 may be used to calculate an estimated amount of play time for the wagering game identified as "Game_Sample_123" based on (i) an assumed bankroll of $100, (ii) a minimum bet of $0.01 (with an assumed minimum bet as percentage of bankroll of 0.01%), and (ii) an average of 45 decisions per hour and a payback percentage of 96.0% (thus a house advantage of 4.0%), the following table of estimated play times can be generated using the following example formula:

$$\frac{(\text{Total \# of Decisons for Bankroll})}{(\text{Avg. Decison Per Hour})}$$

Where the Total # of Decisions for Bankroll is calculated as follows:

$$\frac{\text{Bankroll}}{(\text{Avg. Number of Decisions Per Hour})\times(\text{Min. Bet})\times(\text{\# of Lines}^{*})\times(\text{House Advantage})}$$

*Lines = paylines, hands or other distinct wagering event per round

TABLE 1

| Estimate of Expected Hours of Game Play for $100 Bankroll | |
|---|---|
| # of Lines Played | Expected Hours of Game Play |
| 1 | 123 |
| 5 | 25 |
| 10 | 12 |
| 15 | 8 |
| 20 | 6 |
| 25 | 5 |

Thus, a player who has a $100 bankroll and is considering wagering game "Game_Sample__123" can view the information in the above Table 1 and decide whether (e.g., based on the number of paylines per round that the player likes to play), the estimated hours of game play the player can expect to achieve with the $100 bankroll are satisfactory. If not, the player can consider another game. It should be noted that the simple calculation above is a simplistic one and thus may be relied upon to an 80% confidence level but more complex calculations may need to be performed to achieve a more accurate prediction.

It should be noted that in some embodiments, a calculation similar to the one illustrated above can be performed in response to one or more specific values for one or more wagering game parameters or wagering session parameters input by a player (e.g., via a player interface of an online casino the player is viewing via a PC) and the results of the information can be output to the player. Of course, rather than a calculation, tables of all (or many) possible values for available parameters can be pre-calculated and the data can simply be looked up from a pre-populated table or database upon receiving a player input or selection. In some embodiments, a player may be provided with a menu of available parameters (and, e.g., available values for each available parameters) from which to choose, to make such a look-up embodiment more efficient.

In some embodiments, data such as the estimated time illustrated in Table 1 above can be output to all interested players and not in response to any player input. For example, as described herein, an online casino may output the estimated amount of playtime per $100 bankroll (or another desired bankroll) for one or more wagering games available via the online casino, along with the values of the one or more parameters upon which the data is based (e.g., along with the assumed average number of decisions, minimum bet and house advantage if the above calculations are used).

It should be understood that the calculations described above with respect to Table 1 are example calculations only, to illustrate one possible manner in which an estimated play time may be calculated for a wagering game given some theoretical data available for the wagering game. Other possible calculations (e.g., based on other desired parameters and/or assumptions) may be utilized within the spirit and scope of the embodiments described herein.

For example, in one embodiment the volatility of a wagering game may be taken into account in some manner in calculating a recommendation for a player. One example simple model of taking the volatility of a high-volatility game (i.e., a game in which a large jackpot is very unlikely to occur) is to adjust the calculations described above with respect to Table 1 by (i) assigning an input for payback percentage of the jackpot (based on an understanding that the wagering games with the greater volatility are the ones with a larger portion of the coin-in going towards the top jackpot award and thus making this jackpot award more valuable but at the same time more unlikely to occur); (ii) eliminating the top jackpot from the payback (based on the understanding that only one person will hit this in a given cycle such that this single occurrence is so unlikely such that it is not included in the statistical payback, as the amount of the jackpot skews the game volatility to appear less volatile); (iii) calculating the wagering game's expected payback percentage based on all awards below the top jackpot award. The data in Table 2 below illustrate the results of the above calculation based on assigning a 25% percentage of the total payback percentage of 96% being due to the top jackpot, thus leaving a payback percentage of 71% to use for the formula once the 25% payback percentage ascribed to the top jackpot is filtered out. The data illustrated in Table 2 below is, again, based on a simplified model and thus is accurate to an 80% confidence level.

TABLE 2

| Estimated Hours of Game Play for $100 Bankroll with Top Jackpot Eliminated | |
|---|---|
| # of Lines Played | Expected Hours of Game Play |
| 1 | 17 |
| 5 | 3.4 |
| 10 | 1.7 |
| 15 | 1.1 |
| 20 | 0.9 |
| 25 | 0.7 |

Thus, as can be appreciated when comparing the data in Table 1 to the data in Table 2, taking the volatility of a game into account can have significant impact on the predicted amount of play time that is achievable, theoretically, on a $100 bankroll. Taking volatility into account in other recommendations (e.g., estimated bankroll likely to be sufficient to fund a session of a specified duration) has similar implications. As will be discussed below, taking actual data into account (e.g., in addition to taking the volatility of the wagering game into account) can also in some circumstances provide a more accurate or dependable estimate for a given recommendation.

Referring now to FIG. 4A, illustrated therein is a tabular representation 400A of an example embodiment of an advisory notice database 209 embodied as a database which stores, for a plurality of available wagering games, various estimated bankrolls that are expected to be sufficient to fund one hour of game play given certain specified assumptions (e.g., as it may be stored in a memory of an apparatus 200). Tabular representation 400A is referred to herein as database 400A herein.

The database 400A includes a number of example entries or records, each defining a variety of estimated bankrolls determined to be sufficient to fund one hour of game play (i.e., for a one hour wagering session) for a particular wagering game, each estimated bankroll being based on one of three different values of a wagering session parameter comprising a risk value of a wagering strategy that a player may employ while playing the wagering game. The database 400A is intended to illustrate that, for a given wagering game, the estimated bankroll for a given unit of play time may vary based on one or more factors such as the level of risk in a wagering strategy the player may employ. For example, if the player makes larger wagers relatively more often or takes chances in order to obtain larger prizes (e.g., "goes for the royal" when playing video poker even when perfect play strategy would guide to go for a lesser-paying hand), the player may be said to be employing a high risk strategy as compared to a player who makes relatively smaller wagers and makes more conservative decisions during game play (e.g., going for the lower-paying but more likely to be achieved final hand in a game of video poker rather than trying to "go for the royal" when perfect play strategy would guide otherwise).

It should be noted that seeing the relatively different bankrolls necessary to fund the same amount of game play for the same wagering game given different strategies employed may also help players identify and attempt to play be a specific strategy. For example, a player who is concerned about having his bankroll last as long as possible may realize for the first time that making risky decisions during game play can significantly cut down on his play time given his bankroll. This may in the long run help players spend less money on gambling, since they may not have to add to the bankroll they initially intended to play with for a session if they resolve (or commit to) a lower risk strategy as their goal and thus allow for their bankroll to last them for their entire intended session. As described herein, in some embodiments a player may commit to a goal for a wagering session and a warning message may be output to the player (or the player may be prevented from implementing) a decision during that wagering session that would make it unlikely for the player to meet their goal. Thus, with reference to the embodiment illustrated in FIG. 4A, a player viewing the data illustrated in database 400A (e.g., in the form of a game advisory notice) may select the "low risk" strategy as his goal for the session, which selection may be stored. The player's wagering decisions may be tracked throughout the session and, if the player has or is about to make a decision that falls outside of the "low risk" strategy, the player may be informed of this (or prevented from implementing the decision). In some embodiments, when a decision point occurs within a session, a recommendation may be output to the player based on the strategy the player selected at the beginning of the session.

Referring again specifically to FIG. 4A, the database 400A illustrates a plurality of records R401A through R405A, each record being for a different wagering game, and a plurality of fields for each record. These fields comprise (i) a wagering game ID 410A identifying a wagering game, (ii) an estimated bankroll sufficient to fund the one hour wagering session when employing an average strategy 420A, (iii) an estimated bankroll sufficient to fund the one hour wagering session when employing a high risk strategy 430A, and (iv) an estimated bankroll sufficient to fund the one hour wagering session when employing a low risk strategy 440A. It should be noted that the parameters (and corresponding values of the parameters) defining each of the "average strategy", "high risk strategy" and "low risk strategy" may also be stored (and accessible) in this or a different database or other memory format. Thus, for example, if the data illustrated in database 400A were to be output to players via a game advisory notice for a particular wagering game, the game advisory notice may include information (or a link or identifier allowing the player to view or access the information) which explains the parameters and corresponding values upon which each estimated bankroll was determined. The database 400A may, of course, include any number of entries and different and/or additional fields.

Referring now to FIG. 4B, illustrated therein is a tabular representation 400B of an example embodiment of an advisory notice database 209 embodied as a database which stores, for a plurality of available wagering games, various estimated amounts of play time (or durations of sessions) that are expected to be achievable on a specified bankroll of $100 given certain specified assumptions (e.g., as it may be stored in a memory of an apparatus 200). Tabular representation 400B is referred to herein as database 400B herein.

The database 400B includes a number of example entries or records, each defining a variety of estimated amounts of play time determined to be achievable for a $100 bankroll for a particular wagering game, each estimated amount of play time being based on one of three different values of a wagering session parameter comprising a risk value of a wagering strategy that a player may employ while playing the wagering game. The database 400B is intended to illustrate that, for a given wagering game, the amount of play time for a given bankroll time may vary even within the same wagering game based on one or more factors such as the level of risk in a wagering strategy the player may employ. For example, if the player makes larger wagers relatively more often or takes chances in order to obtain larger prizes (e.g., "goes for the royal" when playing video poker even when perfect play strategy would guide to go for a lesser-paying hand), the player may be said to be employing a high risk strategy as compared to a player who makes relatively smaller wagers and makes more conservative decisions during game play (e.g., going for the lower-paying but more likely to be achieved final hand in a game of video poker rather than trying to "go for the royal" when perfect play strategy would guide otherwise).

It should be noted that seeing the relatively different amounts of play time that may be achievable on the same bankroll for the same wagering game given different strategies employed may also help players identify and attempt to play by a specific strategy. For example, a player who is concerned about having his bankroll last as long as possible may realize for the first time that making risky decisions during game play can significantly cut down on his play time given his bankroll. This may in the long run help players spend less money on gambling, since they may not have to add to the bankroll they initially intended to play with for a session if they resolve (or commit to) a lower risk strategy as their goal and thus allow for their bankroll to last them for their entire intended session. As described herein, in some embodiments a player may commit to a goal for a wagering session and a warning message may be output to the player (or the player may be prevented from implementing) a decision during that wagering session that would make it unlikely for the player to meet their goal. Thus, with reference to the embodiment illustrated in FIG. 4B, a player viewing the data illustrated in database 400B (e.g., in the form of a game advisory notice) may select the "low risk" strategy as his goal for the session, which selection may be stored. The player's wagering decisions may be tracked throughout the session and, if the player has or is about to make a decision that falls outside of the "low risk" strategy, the player may be informed of this (or prevented from implementing the decision). In some embodiments, when a decision point occurs within a session, a recommendation may be output to the player based on the strategy the player selected at the beginning of the session.

Specifically, the database 400B illustrates a plurality of records R401B through R405B, each record being for a different wagering game, and a plurality of fields for each record. These fields comprise (i) a wagering game ID 410B identifying a wagering game, (ii) an estimated amount of play time achievable on a $100 bankroll when employing an average strategy 420B, (iii) an estimated amount of play time achievable on a $100 bankroll when employing a high risk strategy 430B, and (iv) an estimated amount of play time achievable on a $100 bankroll when employing a low risk strategy 440B. It should be noted that the parameters (and corresponding values of the parameters) defining each of the "average strategy", "high risk strategy" and "low risk strategy" may also be stored (and accessible) in this or a different database or other memory format. Thus, for example, if the data illustrated in database 400B were to be output to players via a game advisory notice for a particular wagering game, the game advisory notice may include information (or a link or identifier allowing the player to view or access the information) which explains the parameters and corresponding values upon which each estimated bankroll was determined. The database 400B may, of course, include any number of entries and different and/or additional fields.

Thus, as described with respect to FIG. 3, FIG. 4A and FIG. 4B, information based on statistical probabilities or theory associated with a wagering game can be determined, analyzed, considered and displayed as part of a game advisory notice instead of. In some embodiments, such information based on statistical probabilities and theory can be combined or considered along with information mined from actual game play data (described in more detail with respect to FIG. 5, below). In some circumstances, information determined using actual data will be the similar or even essentially the same as what can be determined using statistical probabilities or theory. In one example, instead of using actual data to determine and communicate an average number of winning payouts per games played, statistical probabilities can be used instead. For wagering games based on a "reeled slot machine" theme, the odds of any winning payout occurring can be combined to express the probability that a winning combination will appear on the reels (e.g., 1 in 5 spins). These odds can then be used to express the same information for a desired number of plays (e.g., instead of 1 in 5 spins, display "a player can expect to get a winning spin 20 times in every 100 spins"). Another exemplary manner of expressing such information may be via tiered symbolic means (e.g., green label means a player can expect to get a winning spin X times in every Y spins, orange label means a player can expect to get a winning spin Z times every W spins, etc.).

Referring now to FIG. 5, illustrated therein is a tabular representation 500 of an example embodiment of wagering game actual database 207 (e.g., as it may be stored in a memory of an apparatus 200). Tabular representation 500 is referred to herein as database 500.

The database 500 includes a number of example fields or entries, each defining data which may serve as the basis for content included on a game advisory notice for a particular wagering game. The data in database 500 is based on actual game play data, as determined by tracking play by real (or virtual) players of a wagering game. Those skilled in the art will understand that an advisory notice database 209 may include any number of records. The database 500 also defines the following example fields (i) a game ID 510 which identifies a wagering game; (ii) an average bankroll per hour 520; (iii) an "avg" field 522 which identifies the bankroll that has been sufficient, on average, to fund one hour of game play of the corresponding wagering game when employing an wagering strategy characterized as being of "average" risk; (iii) a "high" field 524 which identifies the bankroll that has been sufficient, on average, to fund one hour of game play of the corresponding wagering game when employing an wagering strategy characterized as being of "high" risk; (iv) a "low" field 526 which identifies the bankroll that has been sufficient, on average, to fund one hour of game play of the corresponding wagering game when employing an wagering strategy characterized as being of "low" risk; (v) an average play time per $100 bankroll 530; (vi) an "avg" field 532 which identifies the amount of play time achieved, on average, with a $100 bankroll when employing a wagering strategy characterized as being of "average" risk; (vii) a "high" field 534 which identifies the amount of play time achieved, on average, with a $100 bankroll when employing a wagering strategy characterized as "high" risk; and (viii) a "low" field 536 which identifies the amount of play time achieved, on average, with a $100 bankroll when employing a wagering strategy characterized as "low" risk.

It should be noted that although database 500 illustrates pre-analyzed historical data, in some embodiments a wagering game actual database 207 may store raw historical data. For example, wagers made (e.g., individual wagers, average wagers, median wagers, etc.) on a wagering game may be stored. Other examples include, but are not limited to, outcomes achieved, play times achieved for particular bankrolls and wagering decisions made during a session.

In some embodiments, only data from the "avg" fields 522 and 532 may be used. For example, as depicted in the example game advisory notices of screen 1000 on FIG. 10, in some embodiments an online casino may display information usefully to a player in selecting among a plurality of available games, such as the cost to play the game per hour. Thus, for example, data such as that stored in field 522 may be used (e.g., alone or in combination with theoretical data for the "average" strategy) to generate the content for the game advisory notices of FIG. 10. In other words, the "average cost per hour" for the available wagering games may be based on a wagering strategy characterized as being of "average" risk. It should be noted that in some embodiments a player may be provided with the ability to sort available wagering games based on a plurality of available factors (e.g., cost per unit of time, average play time achievable on average for a $100 bankroll, number of times bonus round is entered, on average, per ten (10) minutes of play, number of times the top three (3) prizes are achieved per hour of play time, etc.). Thus, the content of an advisory notice database 209 may include various information besides that illustrated in table 500, as appropriate for the type of information a player can view and base his decision upon.

In some embodiments, historical/actual data for a wagering game may be recorded, analyzed and/or taken into account when determining or calculating content for a game advisory notice. Historical data may comprise data about actual games played. Thus, in some embodiments a game advisory notice may be a representation of (or based on) trends, such as a statistical mean, median, and or mode, found in historical data. As described herein, a game advisory notice may be displayed to players playing or considering playing a wagering game to help them be aware of the potential consequences involved with betting money on a specific wagering game.

In one example, a game advisory notice may include information about how often a player can expect to win (e.g., "On average, this game has 39 winning payouts in every 100 plays"), or about the average size of a game's payouts (e.g., "On average, this game pays around 12 credits). Information about bonuses, game odds, specific outcome frequencies (e.g., a "blackjack" occurring in a game of blackjack or a "royal flush" occurring in a game of video poker) can also be determined and displayed on a game advisory notice. The information displayed in a game advisory notice, or the content for such a game advisory notice, may be determined by a wagering game manufacturer, a casino, regulatory authority, game server 110 or another entity.

The information provided in a game advisory notice, or the contents thereof (it should be understood that when the term "game advisory notice" is used herein, any statements made with respect to it can be applied to the contents of the notice or data supporting the contents of the notice) can in some embodiments be periodically or non-periodically updated to incorporate the latest game data collected, and therefore provide the most accurate advisory information. In one example, game data is constantly collected, however calculations may only occur once every specified unit of time (e.g., once every day, once every week, once every month, etc.). In another example, only a predetermined amount or subset of collected game data is considered when determining the information displayed in a game advisory notice. For instance, only data collected over a specific period of time may be used (e.g., data from the last 60 days). Similarly, only a specific amount of data may be used (e.g., the last 2,000,000 games played). In yet another example, information displayed in a game advisory notice can be calculated in near "real time" so as to incorporate the latest game data. In some embodiments, while actual game play data may be considered when determining the content for a game advisory notice, it may not necessarily be incorporated into the notice. For example, actual game data may be compared to a calculation or determination based on theoretical data and the content of the game advisory notice may only be adjusted based on the actual game data under certain desired circumstances (e.g., if the actual game data differs from the theoretical data by some predetermined threshold). Of course, in some embodiments a game advisory notice may not take actual game data into account at all and be based solely on theoretical game data.

As described herein, wide variety of game data may be analyzed, considered and/or used for purposes of a game advisory notice. Examples of such game data include, but are not limited to: wager size, wager frequency, payout amount, winning vs. losing outcome, bonus game information, bankroll size, change in bankroll over time, number of individual games or wagers played (hands, reel spins, etc.), maximum bet allowed, minimum bet allowed, wagering session information such as session length expressed in time or number of rounds of a game played, game odds, a game's expected value (which refers to a percentage of each bet placed that a player can expect to win per game, calculated over many games played), the house edge, the number of times a game has been played, the number of players that have played a game, the number of players that have won, the number of players that have lost, the number of players that have broken even, etc.

As described herein, the information displayed on a game advisory notice can be theoretical, actual, or a combination of both. As also described herein, players may be able to select the type of information that appears in a game advisory notice. Thus, in some embodiments, if a player chooses to view information derived from actual game data, he or she may be able to select or modify the sample size of game data used to determine the information in a game advisory notice. In one example, a default game advisory notice may display an "Average # of Payouts per 100 spins" based on data collected since the game was provided to players. However, a player may be able to instead choose to see the Average # of Payouts over a shorter period of time, for example over the last month, week, day, hour, etc.

It should be noted that, in some embodiments such as in case of the previous example, the purpose of a game advisory notice may not be focused on providing warning or proper information to a player, but rather designed to allow a player to see recent or possible "trends" that are occurring in the data. Such a feature may therefore appeal to players who believe that games go through "hot" or "cold" streaks. Indeed, despite the fact that players may realize that (many) games of chance are designed such that the outcome of each game or wager is determined exclusive of the outcomes that have occurred previously, many players believe and look for games that are providing favorable outcomes or strings or "slugs" of favorable outcomes at the time they wish to play. For example, many table games players will refer to their luck at playing a game as a result of the table being "hot" or "cold". Therefore, allowing a player to sort or modify the sample size of actual data can allow players to search for what they define as a "hot" or "cold" game.

Applicants realize that the display of information based on a wagering game's actual data may at times be misleading or potentially confusing to a player. For example, a game's odds may state that a jackpot outcome occurs once in every 250,000 spins. However, the actual data may at times reflect that the game has in fact averaged 3 jackpot outcomes per 250,000 spins (which is possible, despite the game odds). Conversely, in another example the same game's game data may report that no jackpot outcomes have occurred in the last 1,000,000 spins (which is also possible, despite the game odds). Thus, information determined based on actual data may in fact conflict with the wagering game's theoretical data. Therefore, in some embodiments, it may be desirable to display actual game trends or data in conjunction with or alongside with the theoretical data so that players are not provided misinformation or potentially misleading information.

In some embodiments, each type of information (i.e., both information based on theoretical data and information based on actual game play data) may be displayed only in certain circumstances, such as if there is a threshold amount of deviation of the information derived from actual data from information based on a the theoretical or statistical data for the wagering game. For example, if information about an average winning payout size per round of a wagering game based on actual game play data deviates more than 3 credits from the probabilistic average payout size per round of the wagering game, then that occurrence may trigger an automatic message alerting the player of the deviation. More specifically, a message may state "The average payout size displayed below is determined using actual game data collected over the last 24 hours. The odds of this game provide for an average payout of 12 credits per winning payout."

Referring now to FIG. 6, FIG. 7 and FIG. 8, illustrated therein are flowcharts of a process 600, 700 and 800, respectively, each of which are consistent with some embodiments. It should be noted that each of the processes 600, 700 and 800 is exemplary only and should not be construed in a limiting fashion. For example, additional and/or substitute steps to those illustrated may be practiced within the scope of the embodiments described herein and in one or more embodiments one or more steps may be omitted or modified. Any and all of the processes 600, 700 and 800 can be performed by a game server 110, a remote gaming device 120, a regulatory authority, an online casino, a third party tasked with performing some of the functionalities described herein, or a combination of any of these.

Referring specifically to FIG. 6, illustrated therein is a process 600 for providing one type of recommendation to a player (e.g., such as via a game advisory notice), namely determining an amount of playtime that a player can anticipate enjoying for a wagering game for a specified bankroll and other relevant data. It should be noted that in some embodiments process 600 may be performed in response to an input from a player. For example, a player can enter (e.g., via a user interface of an online casino) a specified bankroll desired to fund a wagering session for a particular wagering game. The player can, in some embodiments, also enter values for one or more other wagering game parameters or wagering session parameters (e.g., desired wagering strategy) for use in determining the estimated playtime. In other embodiments, however, the process 600 may be performed not in response to any player input but rather in an effort to determine pre-emptively information to output to all players interested in playing the wagering game. In the latter embodiments, the data upon which the estimated playtime is based (e.g., specified bankroll, payback percentage of the game, wagering strategy, number of paylines, etc.) can be displayed or made available to players such that players can be informed of the assumptions upon which the determination of the playtime is based.

The anticipated bankroll is determined (605). Thus, a desired bankroll value may be received from a player or may be selected by a computing device based on one or more instructions or input from a user other than a player. For example, in some embodiments the process 600 may be repeated for a plurality of possible bankrolls (e.g., from $1 to $1000) and step 605 may comprise determining the next possible bankroll value that the calculation of the estimated playtime is to be performed for. In some embodiments, a user such as a programmer or employee of a wagering game manufacturer, an online casino, a third party company or a regulatory authority may input a value for the anticipated bankroll. In some embodiments, additional information associated with the anticipated bankroll may also be received. For example, a wagering game identifier and/or a player identifier of a player providing an input may be received.

Theoretical data for the wagering game is determined (610) for the subject wagering game. For example, a record of wagering game theoretical database 205 may be accessed based on a wagering game identifier associated with the anticipated bankroll. The specific theoretical data determined in 610 depends upon the formula or calculation being used in process 600. A variety of different wagering game parameters and/or wagering session parameters may be appropriate and helpful in calculating an estimated play time achievable on an anticipated bankroll, as described herein. For example, the payback percentage of the wagering game, a payback percentage attributable to awards available in the wagering game other than the top jackpot(s) (if such top jackpot(s) are unlikely to be achieved, as described with respect to Table 2 above), a duration of a round of a game and a minimum, maximum, average or median wager amount are all examples of wagering game parameters which may be useful in process 600 and for which a respective value may be determined in 610. Examples of wagering session parameters which may be useful include a number of paylines (or hands or other discrete wagering opportunities within a round of the wagering game), an intended wager amount per round and a risk characterization of a wagering strategy intended to be utilized in the wagering session. In embodiments in which the estimated playtime is being determined via process 600 based on an input from a player, respective values for such one or more wagering session parameters may also be received from the player (e.g., in 605). In embodiments in which the estimated playtime is being determined via process 600 as a general recommendation for all players interested in playing the wagering game, certain “default” values for such one or more wagering parameters may be stored as part of the theoretical data for the wagering game and accessed in 610. In some embodiments, rather than being looked up in a database, theoretical data for a game may be calculated or generated on the fly.

As described herein, in some embodiments it may be desirable to take actual game data into account when determining a recommendation. Thus, according to some embodiments, actual data for the subject wagering game may be determined (612). For example, a record of the wagering game actual database 209 may be accessed based on the wagering game identifier received in 605.

The anticipated wagering game strategy is determined (615). Determining an anticipated wagering game strategy may, in some embodiments, comprise receiving a selection of the wagering game strategy from the player (e.g., as part of the information received in 605). In other embodiments (e.g., embodiments in which process 600 is performed not in response to any player input or request but rather as a proactive measure in providing helpful information to players), determining an anticipated wagering game strategy may comprise determining a default wagering game strategy based on one or more instructions or rules (e.g., an average risk wagering strategy may be selected). In some embodiments, determining an anticipated wagering game strategy may comprise determining one or more selections for one or more decision events anticipated to occur in a wagering session (e.g., how many paylines to play, whether to employ a “perfect play” strategy in video poker based on statistical probabilities based on initial cards drawn, whether to “double down”, etc.). Thus, in some embodiments there may be some overlap in determining a wagering game strategy and in determining a respective value for one or more wagering session parameters (described above with respect to 610).

An estimated play time is then determined (620) based on the anticipated wagering strategy, the anticipated bankroll and the game data (whether only theoretical data or both theoretical data and actual data is determined). The determination in 620 may comprise, in some embodiments, looking up data in a database (e.g., a database of previously calculated estimated play times calculated for a wide range and myriad of possible data inputs). In other embodiments, the determination in 620 may comprise a real-time calculation based on the inputs received while performing process 600.

It should be noted that the play time determined in 620 is, in many embodiments, indeed an estimate. Thus, actual results may vary from the estimated play time. For example, some calculations such as those described with respect to Table 1 and Table 2 above may be performed with an 80% confidence level (e.g., 80% of wagering sessions will fall within the estimated play time). Of course, a higher confidence level may be achieved with more complex calculations that take into account more variables. It should further be noted that, in some embodiments, the determination of estimated play time 620 may be based only on actual/historical data and not on theoretical data.

Once the estimated play time is determined in 620, it is displayed in 625. Displaying the estimated play time may comprise displaying it to a specific player (e.g., if the process 600 has been performed in response to a specific input or request from a specific player) or generally to any player interested in playing the subject wagering game. Displaying the estimated play time may comprise causing it to be displayed to a player via a display component of a remote gaming device 120. For example, an online casino may serve the estimated play time to a player of the online casino by displaying to the player via a webpage. Further, in some embodiments the estimated play time may be displayed in the form of a game advisory notice (either alone or in association with other recommendations or information regarding the wagering game). In some embodiments, the estimated play time may be displayed in association with the assumptions and values for the parameters which were used to calculate the estimated play time, such that a player can discern the basis for the estimation. For example, the payback percentage, number of paylines played, risk characterization of a wagering strategy (and, in some embodiments, the values for the decisions comprising the wagering strategy that were used to define the wagering strategy risk characterization), wager amount and number of wagering decisions per hour may all be available for viewing by a player (e.g., by clicking on a link associated with the displayed estimated play time).

Example game advisory notices via which an estimated play time may be displayed are illustrated in FIG. 9 and FIG. 10, respectively. In some embodiments, the process 600 continues to the process 800 of FIG. 8 after the estimated play time is displayed.

Referring now to FIG. 7, illustrated therein is an example process 700 for determining an estimated bankroll which is expected to be sufficient to fund an anticipated play time (i.e., a wagering session of an anticipated and specified duration). As with process 600 (FIG. 6), it should be noted that in some embodiments process 700 may be performed in response to an input from a player. For example, a player can enter (e.g., via a user interface of an online casino) a specified amount of play time (i.e., a wagering session of a specified duration) desired to play a particular wagering game. The player can, in some embodiments, also enter values for one or more other wagering game parameters or wagering session parameters (e.g., desired wagering strategy) for use in determining the estimated bankroll. In other embodiments, however, the process 700 may be performed not in response to any player input but rather in an effort to determine preemptively information to output to all players interested in playing the wagering game. In the latter embodiments, the data upon which the estimated bankroll is based (e.g., specified wagering session duration, payback percentage of the game, wagering strategy, number of paylines, etc.) can be displayed or made available to players such that players can be informed of the assumptions upon which the determination of the bankroll is based.

The anticipated play time or session duration is determined (705). Determining the anticipated play time may be similar to determining the anticipated bankroll in 605 (FIG. 6) and will thus not be described in detail for purposes of brevity.

The theoretical game data is determined (710). Determining the theoretical game data in 710 may be similar to the corresponding determination 610 (FIG. 6) and will not be described in detail herein for purposes of brevity.

The anticipated wagering game strategy is determined (715). Determining the anticipated wagering game strategy 715 may be similar to the corresponding determination 615 (FIG. 6) and will not be described in detail herein for purposes of brevity.

An estimated bankroll is next determined (720) based on the anticipated play time, the anticipated wagering game strategy and the wagering game data (whether theoretical only or both theoretical and actual). Again, many of the notations and descriptions made with respect to the corresponding step 620 (FIG. 6) are applicable to the determination in 720 and will not be described in detail for purposes of brevity.

Finally, the estimated bankroll is displayed (725) in a manner similar to the display of the estimated play time (described with respect to step 625 of FIG. 6 above) and thus this step will also not be described in detail herein for purposes of brevity.

As with process 600, process 700 may also proceed to process 800 of FIG. 8 after the display of step 725.

Referring now to FIG., illustrated therein is a process 800 for receiving from a player a desired goal based on a recommendation output to the player (e.g., in the form of a game advisory notice, whether in response to an input from the player or as generally output to all interested players), monitoring the game play of the player to determine compliance with the desired goal and outputting an advisory message to the player if one or more decisions made (or attempted to be made) by the player during game play will make it unlikely (or impossible) for the player to achieve the desired goal. For example, a player may select a desired session duration to be achieved for a specified bankroll. In another example, a player may select a desired maximum bankroll that the player does not wish to exceed in order to fund a session of a specified duration. In yet another example, the player may select a desired outcome to be achieved during a wagering session. In yet another example, the player may select a number of times to enter a bonus round of a wagering game during a wagering session. For purposes of simplicity, the desired goal of the player for purposes of illustrating the process 800 will be a desired bankroll and/or play time (i.e., session duration) to be achieved).

Thus, a selection is received from a player of an anticipated (or desired) play time and/or bankroll to be achieved for a wagering session the player is about to embark on (805). This selection may be stored in association with an identifier identifying the player (e.g., in a local (e.g., volatile or long-term) memory of a remote gaming device 120 and/or a game server 110).

The assumptions underlying the achievement of the anticipated play time and/or bankroll are determined (810). For example, the payback percentage of the wagering game, the wager amount per round of the game (e.g., maximum wager, minimum wager, average wager or median wager), the risk characterization of a wagering strategy (e.g., including values for one or more decisions defining the wagering strategy), the number of paylines to be played per round, the number of rounds to be played and/or a value for another relevant wagering game and/or wagering session parameter may be determined. In some embodiments, such a determination may comprise receiving one or more inputs from the player. For example, if an estimated play time and/or estimated bankroll was determined in step 620 (FIG. 6) or step 720 (FIG. 7) and the player's agreement or selection of the estimated play time and/or estimated bankroll (as displayed in either step 625 or step 725) caused the process 800 to be performed, step 810 may comprise determining or retrieving the assumptions and data upon which the estimated play time and/or estimated bankroll were based in either process 600 or process 700. In some embodiments, a player may be prompted via a plurality of questions or menus to provide values for the one or more relevant parameters determined to be appropriate in determining whether player decisions during a wagering session make it possible or likely for the player to achieve the desired goal received from the player in step 805.

The player's wagering activity for the play session is then tracked (815). For example, the wagers placed (or attempted to be placed) by the player may be tracked, the frequency of rounds of the game played by the player may be tracked and/or other decisions (e.g., which cards to discard in a card game) may be tracked.

In step 820 it is determined whether the player's wagering activity is within the underlying assumptions determined in step 810. For example, it may be determined whether the player's wager (e.g., average wager for the session and/or maximum wager for a current round of the game) is within an acceptable assumed wager. The determination of step 820 may be performed upon each decision made (or attempted to be made) by the player during the session, periodically, upon the player's request, on an ongoing real-time basis or otherwise as deemed appropriate.

If the answer to the query in step 820 is yes, the process loops back to step 815 and the ongoing tracking of the player's wagering activity. Otherwise, if the answer to the query is no, the process 800 continues to step 825, in which step an advisory message is output to the player. Such an advisory message may be a message that a decision the player is about to make would make it unlikely (or impossible) for the player to achieve the goal determined in step 805. In another embodiment, such an advisory message may be a message that a decision made or implemented by the player has made it unlikely that the player will achieve his desired goal. In one embodiment, such an "after the fact" message may be accompanied by a recommendation as to one or more decisions the player can make during the wagering session to make it more likely that the player will achieve his desired goal. For example, a lower wager amount per game play may be recommended. As described herein, in some embodiments a player may be prevented from implementing a decision that would make it unlikely (or impossible) for the player to achieve his desired goal.

Turning now to FIG. 9, illustrated therein is one example form of a game advisory notice 900 that may be output to a player (e.g., as an image with links to information via an online casino). In accordance with some embodiments, the example game advisory notice 900 includes a portion with information descriptive of the wagering game and some assumptions upon which recommendations included in the notice are based (portion 905).

The expression of game advisory notice may occur in a variety of forms. In one example, textual descriptions may be used, such as "This game averages 4 bonus rounds per hour." In another example, a game advisory notice can use a standardized system that makes it easy for players to quickly evaluate a game's risk in comparison with other games and decide whether or not they want to play. In one example, a color coding system can be used to represent whether game characteristics (e.g., average payout frequency or average payout size) are lower, higher or close to average. Red, can represent high, blue can represent low, and yellow can represent "close to average". Portion 910 of the example game advisory notice 900 illustrates some example standardized systems.

Using a standardized system can help potential players of a wagering game compare different wagering games by looking at how multiple game's characteristics compare similar wagering games (such as multiple slot games) with each other. In one example, a player may be trying to decide between two games, one is called "Three Wolves" and the other is called "Reel American Heroes". Three Wolves has a high (red) average bonus round frequency, while the payout frequency per 100 plays is low (blue). On the other hand, Reel American Heroes, has a low (blue) average bonus round frequency, while the payout frequency is high (red). The player, knowing he prefers games with lots of bonus rounds, chooses to play Three Wolves.

In some embodiments, a game advisory notice may provide helpful information to players in a relatively easy to understand manner. For example, the chances of the player obtaining particular outcomes available in the wagering game (based on statistical probabilities built into the game) may be displayed (e.g., as illustrated in portion 930 of the example game advisory notice 900).

As described herein, in some embodiments a game advisory notice may incorporate recommendations regarding game play strategy or behavior, and expectations for the result of a wagering session. Inexperienced or new players of a wagering game may be apprehensive to play the game because they are unsure of the game's rules and or don't fully understand the game's odds. Some players might not know how much of a bankroll is needed to sustain a game's volatility (e.g., "will I run out of money too fast?"), or how much to bet on each hand (e.g., "should I play one line or max coin?"), the pace of the game ("how many hands can I expect to see in an hour?"), etc. Helpful recommendations or an indication of expected session results for such players can be based on actual game play history and/or calculations involving the game's win probability or theoretical data.

Recommendations generally provide one or more desired game characteristics that coincide with a recommended gameplay behavior. Some examples of recommendations are listed below:

At "x" wager amount, "y" rate of play and "z" desired amount of spins, players should start with "R" amount of money With "x" amount of money, "y" rate of play and "z" wager amount, players can expect to play "R" minutes With "x" amount of money, "y" rate of play and "z" wager amount, players can expect to play "R" games At "x" wager amount and "y" bankroll amount, players can expect to play "R" games/minutes At "x" rate of play and "y" desired games, players should start with "R" amount of money At "x" wager amount and "y" desired amount of minutes playing the game, players should start with "R" amount of money.

One or more recommendations can be presented to a player at the same time. In one example, recommendations can be formatted textually (as in the above examples). In another example, they may fill a matrix wherein the x and y axis indicate one or more game or session parameters, and each space within the matrix provides a recommendation at those parameters. As shown in FIG. 9, an exemplary bankroll recommendation matrix may be presented (as in portion 920 of the example game advisory notice 900) wherein the x axis presents an amount of time to be played and the y axis presents a bet amount (in this example, how many lines to play on a slot machine). It should be noted, that in such an example where only two strategy parameters are used for the axis, one or more standard parameters may be assumed or displayed. Using the example shown in FIG. 9, if the x axis represents time played and the y axis represents amount wagered, then an assumed, standard parameter may be "rate of play" (e.g., "20 spins per minute").

In yet another example of an embodiment, the recommended strategy may incorporate suggested behavior based on strategies that many players use according to game data (e.g., "85% of players play max coin.") Similarly, suggestions may be made based on a strategy that gives the player the best chance to win. (e.g., "play max coin because it pays back more than if you play with a smaller wager.)

As described herein, a recommendation may be determined by analyzing game data, using statistical probability and/or a combination of both. In one example, trends may be sought in the game data that exist when players or games are played according to a specific strategy. (e.g., "80% of players lost an average of $10 over 100 spins when cashing in at $50 and played $0.05 per spin.") Portion 925 of the example game advisory notice 900 illustrates some actual game play data based on historical tracking of the play of the wagering game that may be provided on a game advisory notice.

In another example, a statistical analysis can be conducted based on the game's odds to determine how much an average player can expect to win or lose given a set of strategy parameters. The following example helps illustrate how probability can be used to make a recommendation: A player wants to play 100 hands of blackjack, but isn't sure about how much money he should start with. If that player plays 100 hands of blackjack (assume the game has a 3% house edge) and she wagers $5 a hand, she can expect to lose $15. (100 hands×$5 wagers per hand×0.03=$15).

The theoretical situation described above will of course not be the same for all players, and in order to determine how much money a player should start with, or a bankroll a player should plan on using, an analysis of the standard deviations from the expected loss ($15) can be determined. If the square root of number of hands played (100) multiplied by 1 standard deviation is also multiplied by the amount wagered per hand ($5), then it can be said that 68.2% of the players who play the game according to the above parameters can expect to finish the game somewhere between a $65 loss and a $35 win. (i.e., $50 (or 1 standard deviation) in either direction of an assumed $15 loss). Additionally, if the analysis were to account for two standard deviations, then it can be expected that 95.4% of players will finish between a $115 loss and an $85 profit. Therefore, it would be a reasonable recommendation to say that players playing this game should start with a $115 bankroll if they want to play 100 hands of this game at $5 per hand. (only 2.2% of players are expected to lose more than $115. It should be noted that the above example is of course simplified and designed to illustrate one way that a recommendation can be determined.

Recommendations may also be given to players in an interactive manner. Similar to the static recommendations discussed above, an interface can be designed to allow players to input desired strategy or session parameters, and have a "recommendation engine" output a recommended strategy. Any of the following exemplary strategy parameters can be used as player inputs or recommendation engine outputs: rate of play, wager amount, (starting) bankroll, amount of desired play (e.g., expressed in time or an amount of games), a type of wager (e.g., one line vs. max line) and any other game parameters deemed appropriate by one skilled in the art.

In another example, a recommendation engine may provide persistent assistance while the player plays a game. For instance, after a player has decided on the strategy that she would like to use, that player may make an indication to game software that she is going to play according to a specific recommendation. For example, the player may use an input device such as a mouse, keyboard, keypad, button, touch screen, etc. to select a recommended strategy. Then, while the player plays the game, the player can be notified if he or she has departed from a suggested strategy. For instance, if a player begins to play faster than a rate of play that he or she selected (e.g., the player is playing 30 spins/minute instead of a selected 20 spins per minute) then game software may output a notification to the player. Such a warning may say, "You are about to stray from your selected game play strategy." Included in the message may be information about how the change in strategy may affect the player's desired game parameters. (e.g., "this wager may shorten the expected time of this session."). Process 800 (FIG. 8) is one example process that can be used to implement such an embodiment.

In another example, if a player strays from a selected strategy, she may be asked to confirm an altered strategy (e.g., "you indicated a desire to play $5 per hand, do you really want to place a $50 bet?). In another example, a player may be able to track her progress and see how her actual game play differs from a selected strategy (e.g., a game clock may show how long the player has played, how many hands the player has played, how much the player has won or lost, and changes the player made from the selected strategy, any additional buy-ins or cashouts the player may have made, etc.) Additionally, a player may be able to alter her strategy, or see how an altered game parameter may affect his or her overall session. In one example, while a player plays, the game may alter the amount of hands a player can expect to play each time she deviates from a selected strategy. For instance, if the player begins to play faster, the number of hands a player can expect may decrease (this change may be made apparent to the player via one or more output devices.) However, if the player begins to play slower, the number of expected hands may increase. Similarly, if the player begins placing larger wagers, a suggested bankroll amount may increase. Ultimately, any suggested parameters may change based on a player's mid-session strategy alteration.

Analysis of actual game play data may also be used for purposes other than providing a game advisory notice or recommendations. For instance, regulators may require that a casino (online or brick and mortar) prove that they are not cheating players through a comparison of theoretical game data with actual game data. In other words, regulators may audit actual game play history to ensure that the game is creating outcomes according to advertised odds. Once enough actual data has been collected, mathematically there should be little difference between the theoretical and the actual.

For example, a slot machine may be set up (and advertise) a 92% payback percentage, and may have been approved by regulators based on such a payback percentage. A standalone wagering game, or a central controller serving a game over a network, may then record the wager amount and the outcome (payout amount) for every round of the game played (e.g., each handle pull). Over time, software can be used to calculate the percent paid out per wager played, and can also calculate an average payout percentage for all wagers played. The following example illustrates this idea:

Suppose a player wagers $5 on a slot machine-themed wagering game and is paid $4 based on the outcome—dividing the payout amount by the wager amount shows that the game paid out 80% of the wager placed. Next, suppose the player places a second wager of $5 and the game paid out $0, then the game pays out 0% of the wager placed. Finally, if the player then wagers $3 and the game pays out $6, then the game paid out 200% of the wager. If these were the only wagers placed on this machine, ever, then the actual payback percentage for this machine is the sum of all payouts made divided by the sum of all wagers placed ($10 divided by $13), which is 76.9%.

Once the actual payout percentage has been determined, then the actual payout percentage can be compared to the theoretical payback percentage to make sure that the game is "fair". For instance, if a game advertises a 92% payout percentage, and the game is actually paying 89% over the last 2 million rounds of the game played, then the game may not be operating correctly. Players should be allowed to see when this is the case, and regulators should be alerted if a game is not paying true to the odds advertised.

Because math rules allow for some deviation from a statistical probability, regulators or other entities can set up thresholds for actual data deviation from the theoretical data. Therefore, tiered thresholds based on amount of plays played on the machine. E.g.:

1000-10,000 plays: No more than a 7% deviation in either direction 10,001-100,000 plays: No more than a 5% deviation in either direction 100,000-500,000 plays: No more than a 2.5% deviation in either direction 500,001-1,000,000 plays: No more than a 1% deviation in either direction Greater than 1,000,001 plays: No more than a 0.05% deviation in either direction (The examples provided above are illustrative only; in practice deviations specific to each game can be created in order to ensure accuracy.)

Additionally, if the actual game data shows that a game is not paying according to the theoretical payout percentage, then the displayed or advertised payout percentage may become the default. Or, in another example, the theoretical percentage may always be displayed with the actual payout percentage (provided enough games have been played to make the actual percentage reasonable).

Of course, a game advisory notice 900 (when provided in electronic form) may comprise one or more links to access additional information (such as illustrated in the "link" of portion 915, which illustrates some historical data being presented to players based on actual game play of the wagering game and in portion 935, which illustrates buttons that can be used to interact with the notice 900).

Turning now to FIG. 10, illustrated therein is a screen 1000 which may be output to players of an online casino. As illustrated in the content of screen 1000, in some embodiments a recommendation or game advisory notice may be very simple (as compared to the more complex game advisory notice of FIG. 9). The screen 1000 includes links to three distinct wagering games available via the online casino, 1010 through 1030. Each of the links has posted thereon a game advisory notice advising the player of the average cost of playing each of the games for one hour (which cost may be based on theoretical and/or actual data, as described). The cost of the game may comprise the estimated bankroll for playing the game for one hour. Thus, as can be seen from the example data of screen 1000, game 1020 is the most costly to play for one hour while game 1030 is the least costly to play. It should be noted that, as described herein, the average cost of the game icon for each game may be an interactive link that may lead the player to data and assumptions upon which the cost of the game was calculated.

Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A method, comprising:

determining by a processor of a computing device and for a particular wagering game an estimated amount of time a player can expect to play the wagering game with a specified bankroll, thereby determining a duration of a session that can likely be funded by the specified bankroll, wherein the estimated amount of time is determined based on a payback percentage for the wagering game and an assumed value for at least one wagering session parameter;

outputting for display on a remote game device, over the Internet and via an online casino, an indication of the estimated amount of time for the wagering game, thereby outputting an indication of the duration of the session that is likely to be, but is not certain to be, funded by the specified bankroll; and wherein after the outputting for display, the session is playable by the player providing a distinct wager for each round of a plurality of rounds of the wagering game during the session.

2. The method of claim 1, wherein the at least one wagering session parameter comprises: an wager amount per game play; a number of decisions to be made by the player during the estimated amount of time; a level of risk taking assumed to be employed by the player during the estimated amount of time; and a number of paylines per game play wagered upon during the estimated amount of time.

3. The method of claim 1, wherein the estimated amount of time is further based on a volatility of the wagering game.

4. The method of claim 1, wherein the estimated amount of time is further based on historical game play data of the wagering game.

5. The method of claim 1, further comprising:

receiving, from a particular player, an indication of the particular player's intention to play the wagering game for the estimated amount of time by employing the assumed value for the at least one wagering session parameter;

determining, during the particular player's playing of the wagering game, that the particular player has or is about to deviate from the assumed value for the at least one wagering session parameter by a magnitude above an acceptable threshold; and outputting a message to the particular player which indicates that the deviation will result in the estimated amount of time no longer being applicable to a current wagering session.

6. The method of claim 5, further comprising: preventing the player from implementing a wagering decision for the wagering game that deviates from the assumed value for the at least one wagering session parameter by the magnitude above the acceptable threshold.

7. The method of claim 1, wherein determining for the particular wagering game the estimated amount of time comprises determining for the particular wagering game the estimated amount of time a particular player can expect to play the wagering game with a specified bankroll.

8. The method of claim 7, further comprising: receiving, from the particular player over the Interact and prior to determining the estimated amount of time, an indication of at least one of the specified bankroll and the assumed value for the at least one wagering session parameter.

9. The method of claim 7, wherein determining the estimated amount of time comprises retrieving from a database the estimated amount of time, wherein the retrieving is based on the specified starting bankroll and the assumed value for the at least one wagering session parameter received from the particular player.

10. The method of claim 1, wherein the outputting for display comprises outputting for display on a remote game device, over the Internet and via the online casino, an indication of the estimated amount of time to players prior to the players initiating play of the wagering game and prior to the players providing an indication of the specified starting bankroll or the assumed value for the at least one wagering session parameter.

11. A non-transitory computer-readable medium which, when read by a computing device, causes the computing device to:

determine for a particular wagering game an estimated amount of time a player can expect to play the wagering game with a specified bankroll, thereby determining a duration of a session that can likely be funded by the specified bankroll, wherein the estimated amount of time is determined based on a payback percentage for the wagering game and an assumed value for at least one wagering session parameter;

output for display on a remote game device an indication of the estimated amount of time for the wagering game, thereby outputting an indication of the duration of the session that is likely to be, but is not certain to be, funded by the specified bankroll; and wherein after the outputting for display, the session is playable by the player providing a distinct wager for each round of a plurality of rounds of the wagering game during the session.

12. A method, comprising:

determining by a processor of a computing device and for a particular wagering game an estimated bankroll a player can expect to fund in order to play the wagering game for a specified amount of time defining a session, the estimated bankroll being determined based on a payback percentage for the wagering game and an assumed value for at least one wagering session parameter defining the session;

outputting for display on a remote game device, over the Internet and via an online casino, an indication of the estimated bankroll that is likely to be necessary, but is not certain to be sufficient, to fund a session comprising the specified amount of time for the wagering game; and wherein after the outputting for display, the session is playable by the player providing a distinct wager for each round of a plurality of rounds of the wagering game during the session.

13. The method of claim 12, wherein the at least one wagering session parameter comprises: a wager amount per game play; a number of decisions to be made by the player during the estimated amount of time; a level of risk taking assumed to be employed by the player during the estimated amount of time; and a number of paylines per game play wagered upon during the estimated amount of time.

14. The method of claim 12, wherein the estimated bankroll is further based on a volatility of the wagering game.

15. The method of claim 12, wherein the estimated bankroll is further based on historical game play data of the wagering game.

16. The method of claim 12, further comprising:

receiving, from a particular player, an indication of the particular player's intention to fund play of the wagering game with the estimated bankroll by employing the assumed value for the at least one wagering session parameter;

determining, during the particular player's playing of the wagering game, that the particular player has or is about to deviate from the assumed value for the at least one wagering session parameter by a magnitude above an acceptable threshold; and outputting a message to the particular player which indicates that the deviation will result in the estimated bankroll no longer being sufficient to fund a current wagering session for the specified amount of time.

17. The method of claim 16, further comprising: preventing the player from implementing a wagering decision for the wagering game that; deviates from the assumed value for the at least one wagering session parameter by the magnitude above the acceptable threshold.

18. The method of claim 12, wherein determining for the particular wagering game the estimated bankroll comprises determining for the particular wagering game the estimated bankroll a particular player can expect to need to fund play the wagering game for a wagering session lasting the specified amount of time.

19. The method of claim 18, further comprising: receiving, from the particular player over the Internet and prior to determining the estimated bankroll, an indication of at least one of the specified amount of time and the assumed value for the at least one wagering session parameter.

20. The method of claim 19, wherein determining the estimated bankroll comprises retrieving from a database the estimated bankroll, wherein the retrieving is based on the specified amount of time and the assumed value for the at least one wagering session parameter received from the particular player.

21. The method of claim 12, wherein the outputting for display comprises outputting for display on a remote game device, over the Internet and via the online casino, an indication of the estimated bankroll to players prior to the players initiating play of the wagering game and prior to the players providing an indication of the specified amount of time or the assumed value of the at least one wagering session parameter.

22. A non-transitory computer-readable medium which, when read by a computing device, causes the computing device to:

determine for a particular wagering game an estimated bankroll a player earl expect to fund in order to play the wagering game for a specified amount of time defining a session, the estimated bankroll being determined based on a payback percentage for the wagering game and an assumed value for at least one wagering session parameter defining the session;

output for display on a remote game device, over the Internet and via an online casino, an indication of the estimated bankroll that is likely to be necessary, but is not certain to be sufficient to fund a session comprising the specified amount of time for the wagering game; and wherein after the outputting for display, the session is playable by the player providing a distinct wager for each round of a plurality of rounds of the wagering game during the session.

* * * * *

UNITED STATES PATENT AND TRADEMARK OFFICE

CERTIFICATE OF CORRECTION

PATENT NO. : 8,512,149 B2
APPLICATION NO. : 12/891781
DATED : August 20, 2013
INVENTOR(S) : Jay S. Walker et al.

It is certified that error appears in the above-identified patent and that said Letters Patent is hereby corrected as shown below:

IN THE CLAIMS

In Claim 1, Column 35, Line 15, after ";" insert --and--.
In Claim 1, Column 35, Line 21, delete "and".
In Claim 2, Column 35, Line 27, replace "an" with --a--.
In Claim 5, Column 35, Line 50, delete the first instance of "the".
In Claim 6, Column 35, Line 54, between the first instance of "the" and "player" insert --particular--.
In Claim 7, Column 35, Line 62, replace "a" with --the--.
In Claim 8, Column 35, Line 64, replace "Interact" with --Internet--.
In Claim 9, Column 36, Line 4, delete "starting".
In Claim 10, Column 36, Line 8, replace "a" with --the--.
In Claim 10, Column 36, Line 12, delete "starting".
In Claim 11, Column 36, Line 25, after ";" insert --and--.
In Claim 11, Column 36, Line 30, delete "and".
In Claim 12, Column 36, Line 43, after ";" insert --and--.
In Claim 12, Column 36, Line 47, replace "a" with --the--.
In Claim 12, Column 36, Line 48, delete "and".
In Claim 16, Column 37, Line 10, delete the first instance of "the".
In Claim 17, Column 37, Line 14, between the first instance of "the" and "player" insert --particular--.
In Claim 17, Column 37, Line 15, delete ";".
In Claim 21, Column 38, Line 5, replace "a" with --the--.
In Claim 22, Column 38, Line 15, replace "earl" with --can--.
In Claim 22, Column 38, Line 20, after ";" insert --and--.
In Claim 22, Column 38, Line 25, delete "and".

Signed and Sealed this
Eighth Day of April, 2014

Michelle K. Lee

Michelle K. Lee
*Deputy Director of the United States Patent and Trademark Office*